Oct. 18, 1966 W. WEIGLER 3,280,314
DIGITAL CIRCUITRY FOR DETERMINING A BINARY SQUARE ROOT
Filed July 12, 1963 10 Sheets-Sheet 1

INVENTOR
WILLIAM WEIGLER
BY Thomas J Nikolai
ATTORNEY

△ IF OVERFLOW
△△ IF $A^*_{R16} = 1$

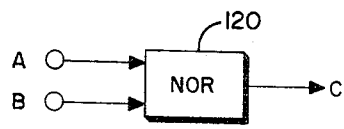
Fig. 5
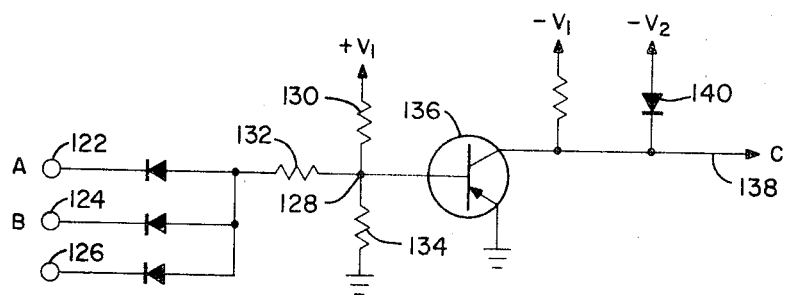
Fig. 6
Fig. 7
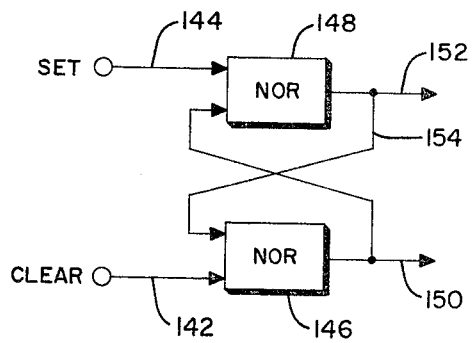
Fig. 8
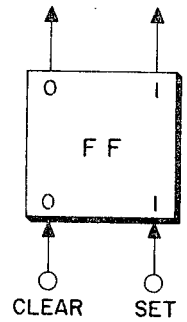
Fig. 9

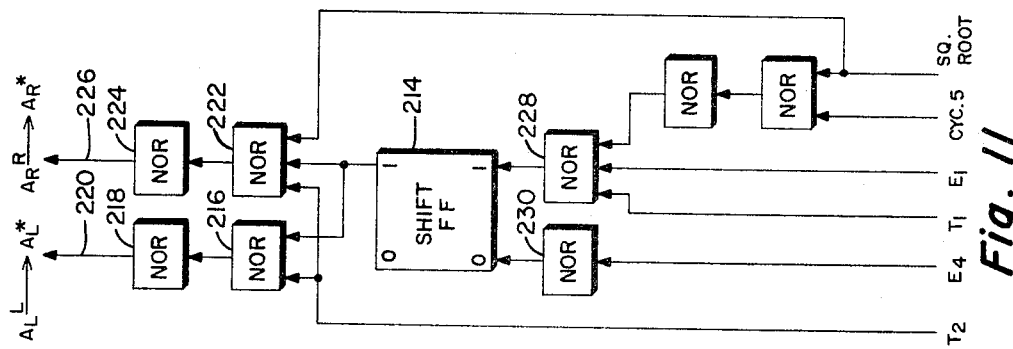
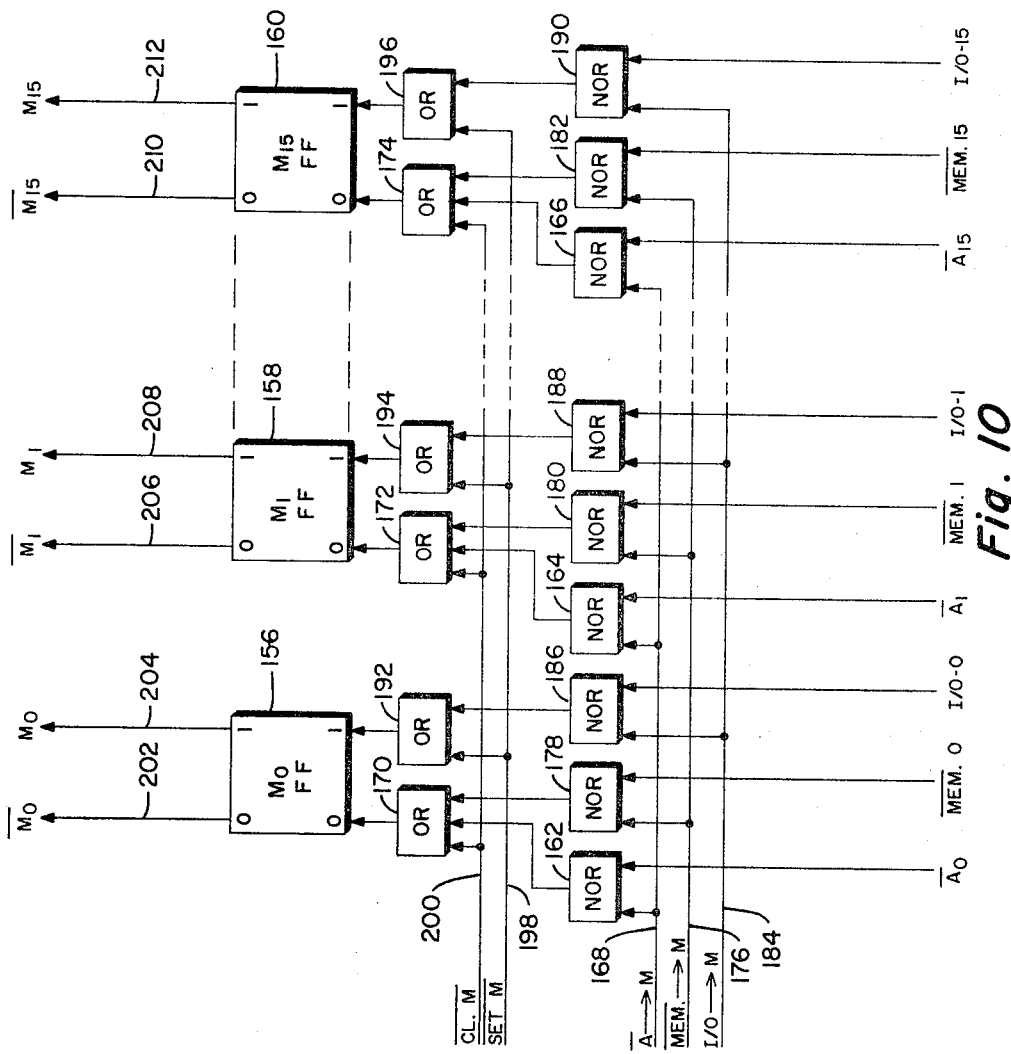
Fig. 11
Fig. 10

United States Patent Office

3,280,314
Patented Oct. 18, 1966

3,280,314
DIGITAL CIRCUITRY FOR DETERMINING A
BINARY SQUARE ROOT
William Weigler, St. Paul, Minn., assignor to Sperry Rand
Corporation, New York, N.Y., a corporation of Delaware
Filed July 12, 1963, Ser. No. 294,519
9 Claims. (Cl. 235—158)

The present invention relates generally to electronic digital data processing apparatus and more particularly to an improved circuit arrangement employed in such apparatus for finding the square root of a binary number.

In the prior art there are described computers which may be programmed to extract the square root of a binary number by carrying out a program or sequence of instructions to solve an approximation formula. The steps are repeatedly executed, with the answer becoming a better approximation to the actual root each time. The repeated approximation method of computing the square root of a number is generally quite time consuming. In the computer described in the present specification, there is included circuitry and apparatus for extracting the square root of a number. In other words, instead of programming a plurality of separate instructions for extracting the square root of a number, it is only necessary to execute a single instruction, namely, the Square Root instruction, to arrive at the desired result.

A digital computer having a built-in instruction for extracting the square root of a number is not new per se. For example, in the Weiss Patent 2,888,200, which issued May 26, 1959, on an application filed July 1, 1953, entitled "Circuitry for Performing Square Root," there is described one method of implementing a built-in instruction for finding the square root of a number. The method described in this patent is modeled after the well-known technique wherein a successive series of increasing odd numbers are subtracted from the radicand until an overdraft is detected. On the detection of an overdraft, i.e., a change in the sign from the one which the remainder carried before the subtraction, the trial root is modified in a predetermined manner and shifted until the subtraction can be carried out without producing an overdraft. This process of subtracting, detecting, modifying and shifting is repeatedly carried out until the difference becomes zero or until the predetermined number of significant digits in the answer have been obtained.

In adapting this method to a digital computer operating with binary numbers, Weiss provides a first register for initially storing the complement of the radicand. A second register is also provided which initially is made to contain the digits 0 and 1, in that order, in the two most significant digit positions. During the first cycle of computation, an examination is made to determine whether or not the addition of the contents of the first and second registers will cause the generation of a carry signal. If this carry signal is not generated, the addition of the contents of the first and second registers is performed. At the same time, a binary 1 digit is inserted in the most significant digit position of the second register and the digits 0, 1 are inserted in the next two lower-order stages of the second register.

If the initial addition of the contents of the first and second registers would have caused a carry signal to be generated from the highest-order digit position, the addition is not carried out. Instead, a 0 digit is inserted in the most significant stage of the second register and the digits 0, 1 are inserted in the next two lower-order positions. During the next cycle of computation, the contents of the second register are shifted one digit position to the right and an inspection is again made to determine whether a carry signal would be generated as a result of adding the current contents of the second register with the contents of the first register.

The method employed in the computer of the present invention for extracting the square root is somewhat similar to a method described in the aforementioned Weiss patent. However, the manner of implementing the instructions with electronic circuitry is substanitally different. Stating it in another way, the apparatus of the Weiss patent and of the present invention both determine the square root of a number by the well-known process of subtracting an increasing series of odd numbers from the radicand, but the "hardware" used to carry out the function in each instance is substantially different. In fact, one of the chief advantages of the present invention is that the square root instruction is implemented with substantially less circuitry than is required in the prior art systems. Because of the unique manner in which the carries are clamped in the algorithm there is no longer a need for the additional hardware (extra gating path) which were heretofore required in prior art computers only for the square root instruction.

Still another advantage of the present invention is that little circuitry need be added over and above that normally contained in digital computing equipment to provide a "wired-in" instruction for executing the square root operation. More specifically, in order to calculate the square root of a number, all that need be included in the computer are three registers, at least one of which has shifting properties, an adder circuit, and suitable control circuitry for generating the gating and control signals needed to transfer information back-and-forth among the registers and the adder. Those skilled in the art will readily recognize that this apparatus must also be included if the ordinary computer functions are to be carried out.

The steps performed by the circuitry of the present invention in extracting this square root of a number are set forth briefly below.

When the square root instruction is loaded into the instruction register and the operation code portion thereof is examined, control circuitry becomes activated for loading a first register with the desired radicand operand, loading the second register with an approximate or trial root and loading a third register with a predetermined constant. Subsequently, the contents of the second register are subtracted from the contents of the first register with the results being left in the first register. A test is then made to determine whether this subtraction produced an overdraft, i.e., whether the contents of the second register were greater than the contents of the first register. If the contents of the second register were less than the contents of the first register, the difference remaining in the first register is shifted one place towards the most significant digit position while the contents of the third register are shifted one place toward the least significant digit position. After these shifting steps have been accomplished, the contents of the second and third registers are added with the sum being left in the second register. The subtraction step along with the shifting and adding steps are repeated until the contents of the third register are shifted the full extent of the register, or until the execution of the subtraction step produces an overdraft.

In the event that an overdraft signal is produced upon the subtraction of the contents of the second register from the contents of the first register, the contents which existed in the first register prior to the subtraction step are shifted one place toward the most significant digit position while the constant contained in the third register is shifted one place toward the least significant digit position. As before, the contents of the second and third registers are then added, but in this case, the Sum Modulo-2 is formed instead of the true sum. In other words, when an overdraft condition is detected and the shifting is performed the contents of register 3 are added to the contents of register 2, but any carry signals generated during this addition are inhibited. The calculation ceases when the constant contained in the third register has been shifted the entire extent of the third register such that a 1 digit exists in the least significant digit position.

During any particular cycle or iteration, $n$, of the square root extraction, the binary partial root developed in the second register may be represented by $R_1, R_2, R_3 \ldots R_n$ 0, 1, where $R_1$ through $R_n$ are the most significant $n$ bits of the exact final root determined during iterations 1 through $n$. During the following iteration i.e., iteration $n+1$, the previousuly generated bits of the partial root $R_1$ through $R_n$, are left unaltered. In other words, once an additional significant digit of the answer is developed on a particular iteration, it remains unchanged during the remaining cycles of computation used to develop the entire square root operand. This is a marked advantage over prior art digital calculators having built-in square root instructions.

It is accordingly an object of the present invention to provide a novel circuit arrangement for extracting the square root of a number.

Another object of the present invention is to provide apparatus for performing the square root function in a digital computer which is less complicated and less expensive than prior art apparatus.

Still another object of the present invention is to provide a novel arrangement for extracting the square root of a number by developing significant digits of the answer during a plurality of separate cycles or iterations.

A still further object of the present invention is to provide apparatus for extracting a square root of a number during successive cycles wherein there is no need to alter a previously developed significant digit of the partial root once it is calculated on a previous cycle.

Yet another object of the present invention is to provide a "built-in" square root instruction for a digital computer wherein control is exerted over the propagation of carry signals such that the extra gating paths required in prior art machines only for the square root instruction are dispensed with.

These and other objects of the present invention will become more apparent upon reading the following description in light of the accompanying drawings which disclose the principles of the invention and the best mode which has been contemplated of applying these principles.

In the drawings:

FIG. 5 illustrates the symbol used to represent a NOR circuit, the building block used to perform logic in the computer;

FIG. 6 illustrates a truth table for a NOR logic circuit;

FIG. 7 illustrates the schematic diagram of an electronic circuit which may be used to implement NOR type logic;

FIG. 8 shows the manner in which two of the circuits of FIG. 5 may be conected together to provide a digit storage stage or flip-flop;

FIG. 9 shows the symbol used to represent the flip-flop circuit;

FIG. 10 is a block diagram of a typical register used in the computer;

FIG. 11 is a more detailed block diagram of the Shift Control circuit of FIGURE 3;

GENERAL ARRANGEMENT

Figure 1:
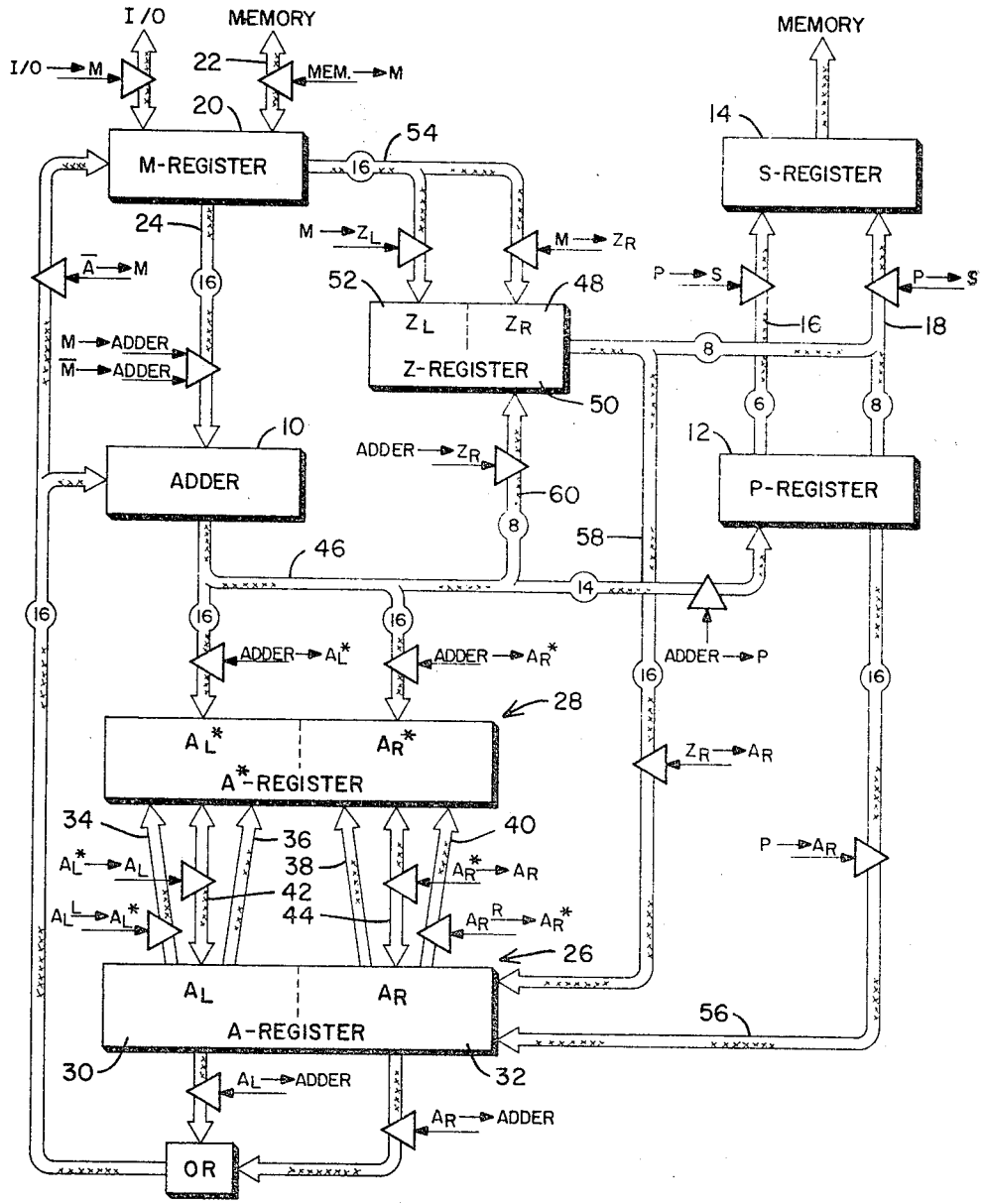
FIG. 1 is a block diagram illustrating a preferred embodiment of the computer incorporating the present invention.

Referring now to FIG. 1, there is shown a simplified block diagram of the principal registers and circuits of the computer incorporating the novel square root algorithm of this invention. The computer in which the square root instruction is to be incorporated is a fractional machine wherein all numbers are scaled such that they lie within the range $0 \leq |X| < 1$.

In FIG. 1 the various transfer paths between registers are illustrated as cables having arrowheads indicating the direction of information flow. At a point intermediate the start and end of the cable, it widens out into a circular area. The number within the circle on each of these cables indicates the number of conductors contained within the cable itself. The transfer of information between two registers or between a register and the adder is controlled by gate circuits. These gates are represented in FIGURE 1 by the triangles on the various cables, the command enable signals for "opening" these gates being indicated adjacent the triangles.

As is shown in FIG. 1, a single adder 10 is provided, which is used for all arithmetic operations, operand address modifications, and for advancing the program address register or P-register 12. It is this last-mentioned register which is designed to contain the address of the next instruction in a program of instructions to be executed. Upon completion of the execution of a current instruction, the control section of the computer provides a signal which is effective to open gates between the P-register 12 and the storage address register or S-register 14, such that the address of the next instruction is loaded therein by way of cables 16 and 18. The storage address register is connected to a random access memory (not shown) in a conventional manner so that when the memory is initiated by a signal from the control section of the computer, the instruction word or operand stored at the address currently contained in the S-register will be read out from the memory and into the memory exchange register or M-register 20 by way of cables 22. The M-register 20 is also employed in reading a particular word of data into the memory.

The M-register is used not only for referencing instruction words, but also for temporarily storing operand words read out from the memory. In addition to its functions as a memory exchange register, the M-register 20 is also used during arithmetic operations of addition and subtraction to contain one of the operands which is to be transferred to the adder 10 via cable 24.

The principle arithmetic registers employed in the computer under consideration here are the A-register and the A*-register indicated generally by the numerals 26 and 28, respectively. The A-register 26 may be considered to be the second rank of the A*-register 28. Also, the A and A*-registers 26 and 28 are preferably double length registers divided into left halves and right halves, respectively. The left half of the A-register ($A_L$) is identified by numeral 30 whereas the right half of this register ($A_R$) is identified by numeral 32. Each of the register halves may be sixteen bits in length and may have gated input lines for each stage thereof such that a control signal for enabling these gates is needed before the transmission of data between the registers can be accomplished.

The A and A*-registers 26 and 28 are also used to perform shifting functions called for by certain instructions. To accomplish this shifting function, gated conductors in the cables 34, 36, 38 and 40 are connected from stage N of the second rank A-register 26 to stages N−1, and N+1 of the A*-register 28. When it is desired to shift an operand to the left, a control signal is applied to the gates in the lines within cables 34 and 38 connecting the individual stages of the A-register to the stages of the A*-register of a next lower-order digit position. If it is desired to shift an operand in the A-register to the right, a control signal is employed to open the gate in the conductors within cables 36 and 40 connecting the individual stages of the A-register 18 to the stages of the A*-register 20 having a higher-order digit position. Subsequent to this transmission, the contents of the A*-register are retransmitted directly to the A-register, i.e., from stage N of the A*-register to stage N of the A-register via cables 42 and 44.

The second rank of the accumulator, i.e., the A-register 26, is used during other arithmetic operations to hold an operand prior to the transmission of this operand to the adder 10. For example, in the case of a double length addition or subtraction instruction, the least significant 16-bits of the addend are read from the memory into the M-register 20. The contents of the right half 32 of the A-register (the least significant 16-bits of the augend) and the contents of the M-register are then switched into the adder during an addition. During a subtraction, the contents of $A_R$ and the complement of the contents of the M-register ($\overline{M}$) are gated into the adder and a carry signal is forced into the least significant bit position of the adder. In other words, the two's complement of the contents of the M-register is switched into the adder. The sum or difference is subsequently gated into the right half of the A*-register via cable 46. The most significant 16-bits of the addend are next acquired from the memory by setting the least significant bit of the S-register 14. The addition or subtraction is again repeated, this time using the most significant bits of the augend contained in the left half 30 of the A-register ($A_L$) along with a carry (if generated) from the first addition or subtraction.

The Z-register 48 in the computer described herein is a 16-bit register adapted to hold instruction words read out from the memory while the designators thereof are translated and the operations called for are executed. The Z-register is also split into two halves 50 and 52 identified respectively by $Z_L$ and $Z_R$.

During the execution of an instruction, the instruction is read out of the memory and into the M-register 20 by way of cable 22 and is subsequently transferred to the instruction register 48 by way of cable 54. During this time, the address contained in the program address register 12 is transferred to the right half of the A-register 26 along cable 56, and from there, is switched into the adder 10. The M-register 20 is disconnected from the adder at this time and a carry signal is forced into the least significant bit of the adder. The effect of this is to increment the contents of the P-register by one. The output from the adder is then returned to the P-register so that the address of the next instruction in a sequence of instructions is available. When the instruction read out from the memory to the instruction register 48 via the M-register 20 is a Jump instruction, there is no need to increment the contents of the program address register, P, by one. During the execution of a jump instruction, the contents of the M-register, i.e., the Jump instruction, is gated into the adder. At the same time the A-register 26 is cleared to zero. Because the addition of the contents of M with the previous contents of the A-register had already begun, it is now too late to get the sum of the contents of M and the current contents of A (zero) out of the adder. Therefore, use is made of the "carry clamp" feature to cause the only jump address in M to appear at the output of the adder where it is available to the P-register. More specifically, when the OP Code for the Jump instruction is decoded, the computer's control circuits become operative to produce the Carry Clamp signal. This signal is applied to gates in the adder and serves to disable these gates so that the carry signals are not allowed to propagate.

As will be explained in detail later in this specification, the same circuitry used for generating this clamp signal during the execution of the jump instruction are used to develop the clamp signal during the square root extraction operation.

As is quite common in the art, the instruction word may comprise a plurality of designators each a predetermined number of binary digits in length. For example, an instruction might include an OP CODE designator, a B-BOX designator and an OPERAND ADDRESS designator.

In the event that the instruction calls for a modification of the address portion thereof, the address modifier specified by certain bits of the instruction word, i.e., the B-BOX designator, is read out from the selected one of a set of memory registers into the M-register. At the same time the contents of the right half of the Z-register 48 (the address to be modified) is transferred to the right half of the A-register 26 by way of cable 58. Subsequently, the contents of $A_R$ and the M-register 20 are switched into the adder 10. The modified operand address ($M+Z_R$) is gated from the adder output to the $Z_R$-register via cables 46 and 60.

Figure 2:
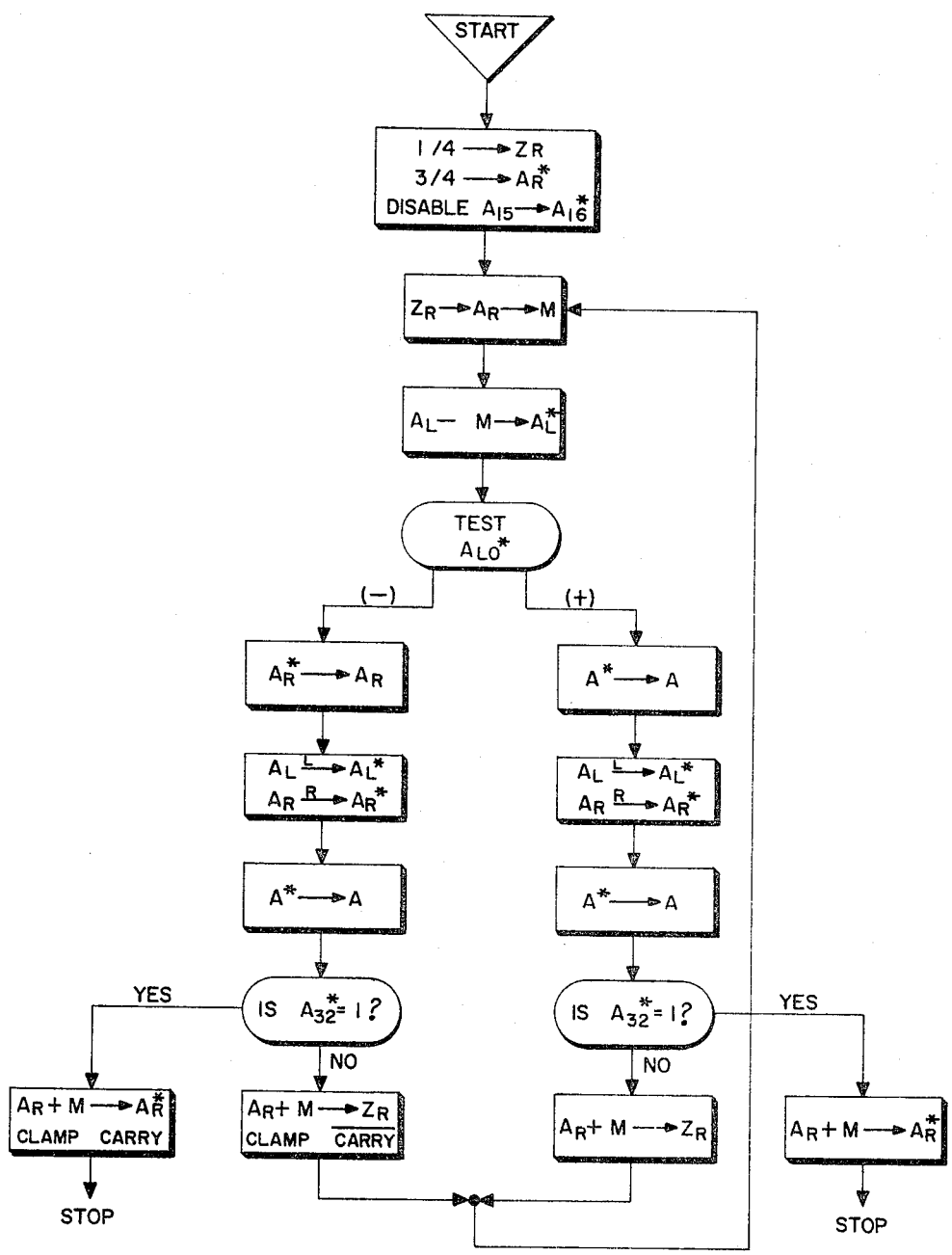
FIG. 2 is a flow chart showing the novel square root algorithm.

Now that the principal registers and data paths of the computer incorporating the novel square root instruction of the present invention have been described generally, consideration will next be given to the flow chart of FIG. 2 with illustrates the various steps in the square root computation.

As is well-known in the digital computing field, it is desirable to have a distinct symbology whereby the steps in the solution of a problem may be represented pictorially. The flow diagram of FIG. 2 is such a pictorial representation. The rectangular block in the flow diagram is the symbol used to describe one step in the solution of a problem. Contained within the rectangular block is a brief statement of the function to be accomplished. Each of these operation boxes will normally have a single input and a single output. The oval shaped symbol illustrated in the FIG. 2 is utilized to indicate when a decision must be made. The decision symbol will normally have one input line, but will have two output lines to represent the alternatives in the decision. Within the symbol is stated the question to be answered; this question normally being of a nature such that it can have a yes or no answer.

With these conventions in mind, consideration will now be given to the steps taken in extracting the square root of a number.

The execution of the square root instruction by the computer causes the square root of the number contained in the left half of the A*-register to be extracted and placed in the right half 32 of the A-register. This instruction may be written symbolically as $\sqrt{A^*_{-L}} \rightarrow A_R$. Initially then, the number whose root is desired must be located in the $A^*_L$-register. Once the square root instruction is placed in the Z-register 48 such that the operation code portion of the instruction word lying in $Z_L$, can be examined by the Z-register translator, command enable signals are generated by the control section of the computer at predetermined times to effect the requisite data transfers. First, control signals are generated for loading the constant ¼ (binary 0.01) into the right half of the Z-register ($Z_R$). This is accomplished by initially clearing $Z_R$ and then by subsequently setting bit 2 thereof. At the same time, the constant ¾ (binary 0.11) is loaded into the right half of the $A^*$-register ($A^*_R$). This is accomplished by initially clearing $A^*_R$ and by subsequently setting bits 1 and 2 thereof, leaving the remaining bits in this register in their cleared states. For reasons which will become more obvious from the description yet to be presented, during the initial steps of the square root execution the gate connecting stage 15 of the A-register to stage 16 of the $A^*$-register is disabled, thereby preventing any information transfer over this path.

During the next cycle of operation, the trial root of ¼ contained in $Z_R$ is transmitted both to the $A_R$ and M-registers. This step is followed by the subtraction of the value contained in the M-register from the radicand now contained in the $A_L$-register 30. The results of this subtraction are subsequently gated into the left half of the $A^*$-register. Next, the state of stage 0 of the $A^*$-register, i.e., the stage containing the sign bit, is examined. If the above mentioned subtraction caused a negative number to be left in the $A^*_L$-register, a first sequence of further operations is executed. However, if the examination of the sign bit indicates that the subtraction did not produce an overdraft, such that the quantity contained in the $A_L$-register is positive, a second and slightly different sequence of steps is carried out. More specifically, when the subtraction step produces an overdraft, the number contained in the $A_L$-register prior to the subtraction step is shifted one place to the left during the transmission thereof to the $A^*$-register 28 via cable 34. If the subtraction does not produce an overdraft, it is the difference resulting from the subtraction that is shifted left during the transmission to the $A^*_L$-register. In either instance, as the left shift of the contents of the $A_L$-register is taking place, the contents of $A_R$ are shifted right one place during the transmission thereof to the $A^*_R$-register via cable 40. The shifted results contained in the $A^*$-register are subsequently retransmitted back to the A-register by way of cables 42 and 44.

Next, the quantity contained in $A_R$ is added to that contained in the M-register, with the result being transmitted from the adder 10 to the $Z_R$ register by way of cables 46 and 60. If during the subtraction step an overdraft had been created, the above mentioned addition step is executed with any carry signals resulting being clamped, such that the number remaining in the $Z_R$-register after the addition step is performed is the Sum Modulo-2 of the contents of $A_R$ and M, as distinguished from the true sum of the contents of these two registers. On the other hand, if the original subtraction step does not produce an overdraft, the carry signals are not clamped during the addition steps and the true sum of the contents of $A_R$ and the M-registers is transmitted to the $Z_R$-register.

After the shifting and adding steps are performed, the least significant digit storing stage of the $A^*$-register is examined. If this stage of the $A^*$-register contains a one-digit, the contents of the $Z_R$-register are transmitted to the $A_R$-register and the square root extraction process is terminated. On the other hand, if the test of the $A^*$-register indicates that a 0 is stored in the least significant digit position thereof, the contents of the $Z_R$-register 50 are transferred to the right half 32 of the A-register and to the M-register 20, and the subtraction, testing, shifting, adding and testing steps are again repeated. Each time the above-mentioned steps are repeated another significant digit of the desired square root is developed in the $Z_R$-register.

Now that the steps in the computation have been explained in detail with the aid of the flow chart of FIG. 2, consideration will next be given to the circuits for generating the requisite control signals used to step the various registers and other circuits of the computer in such a way that instructions may be executed. Because the present invention is concerned chiefly with the square root instruction, the operation of the control circuits will be discussed in this capacity. However, it is to be understood that the control circuits are also used for generating the command enable signal for executing other arithmetic and information transferring functions. In fact, the hardware needed over and above that required for implementing the normal computer instructions, for the square foot function is quite small.

Figure 3:
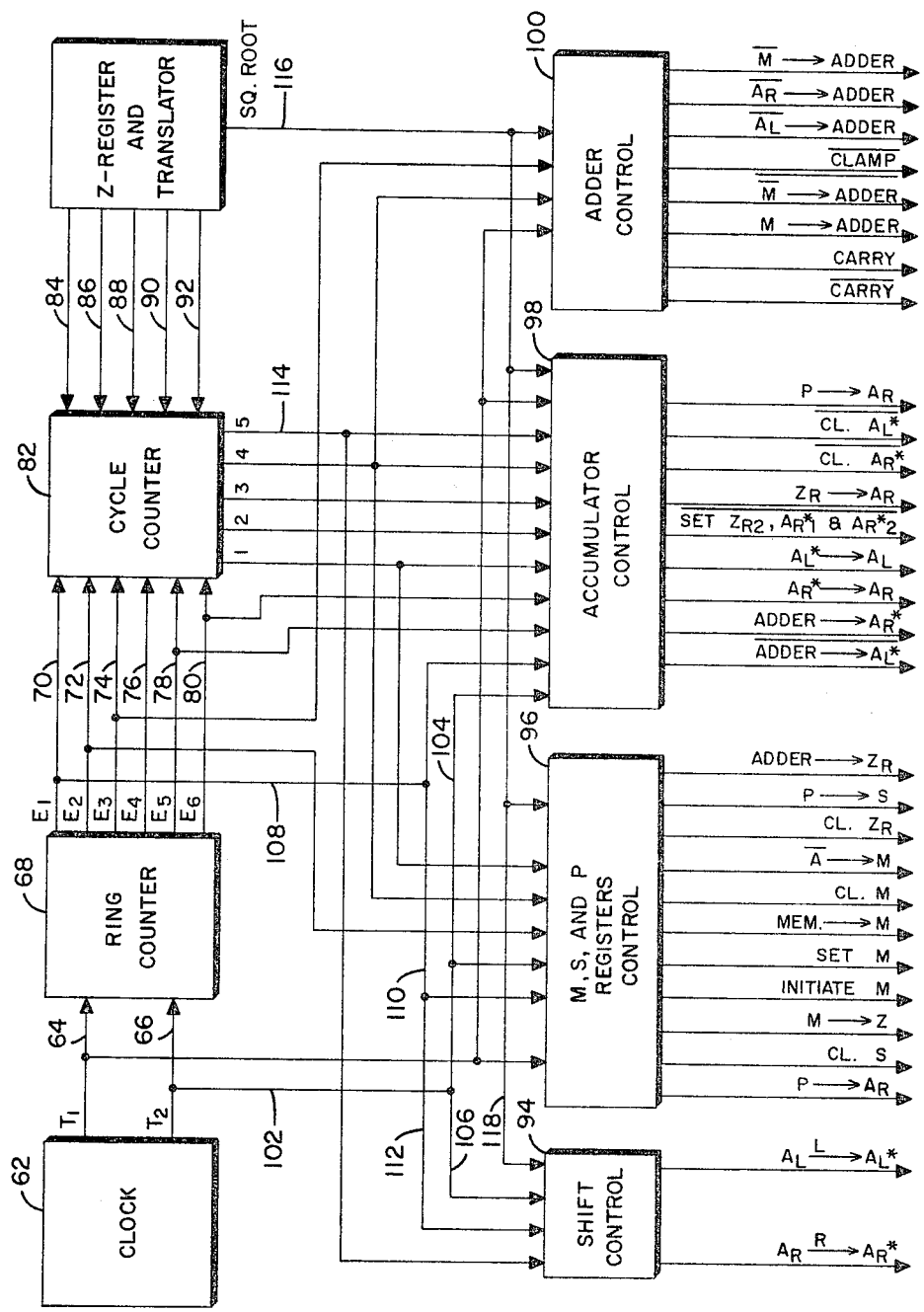
FIG. 3 illustrates by means of a general block diagram, the control circuits of the computer of FIG. 1.
Figure 4:
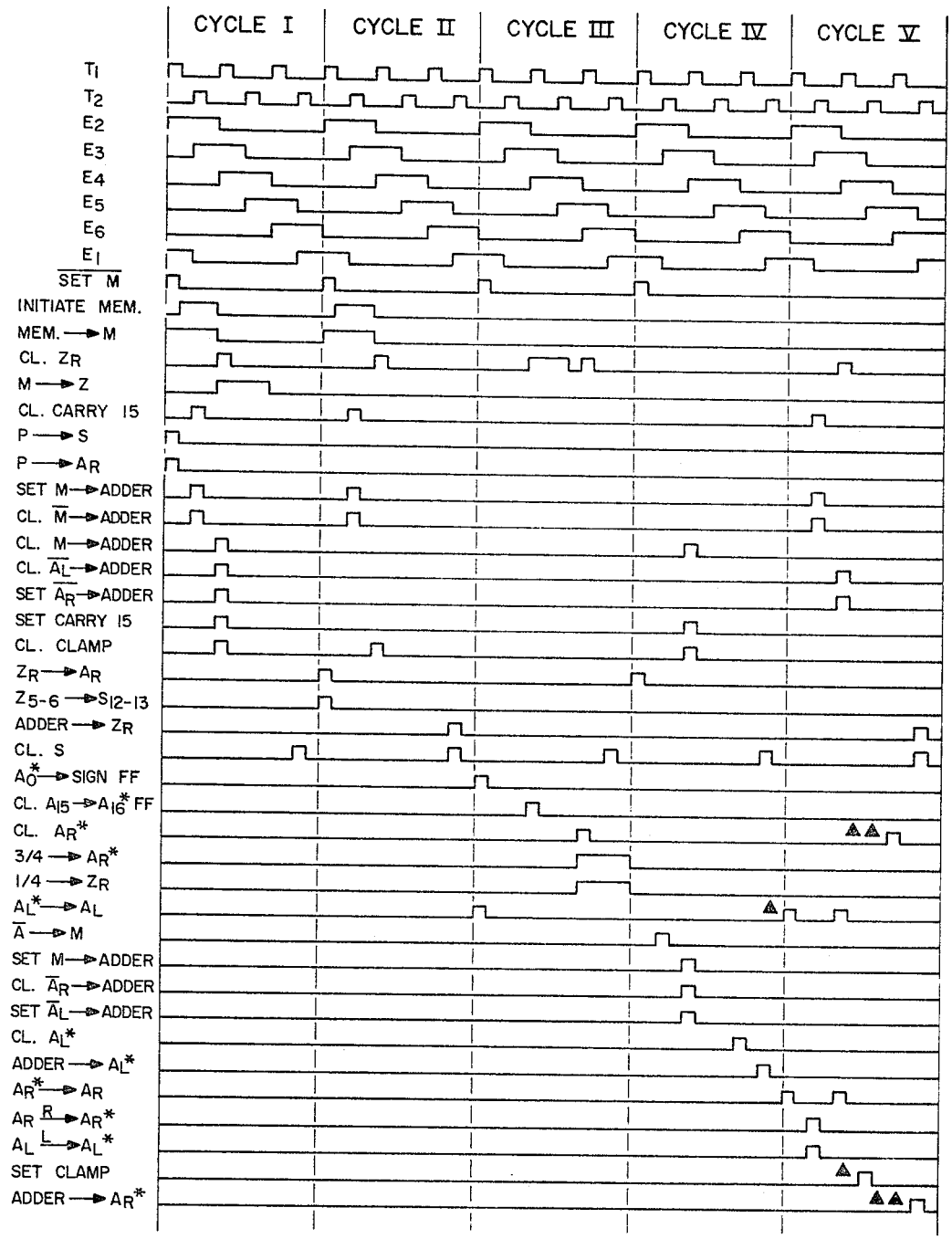
FIG. 4 shows the timing diagram of the control circuits of FIG. 3.

FIG. 3 is a block diagram representation of the control circuits. As is illustrated in FIG. 3, there is provided a clock circuit 62 which may take the form of a free-running multi-vibrator or square wave oscillator. The clock is designed to produce recurrent square wave signals which are 180° out of phase with one another on a pair of output lines 64 and 66. In FIG. 4 the wave form of the signals emitted by clock 62 are labeled T1 and T2. In the computer described herein these T1 and T2 pulses are positive going voltage excursions having a repetition rate of one pulse every 1.2 microseconds and a duration of 0.3 microsecond, but limitation of the invention to a computer having these particular values and polarities is not intended and should not be inferred.

The output signals from clock 62 are applied by way of conductors 64 and 66 to the input terminals of a ring counter 68. As can best be seen in FIGURE 4, each time the ring counter 68 receives either a T1 or a T2 pulse, a different stage of the counter is energized causing signals to appear on the output conductors 70 through 80 in a predetermined sequence. As is shown in the timing diagram of FIG. 4, the signals E1 through E6 appearing on the conductors 70 through 80 respectively, are partly overlapped and the even phases ($E_2$, $E_4$ and $E_6$) are initiated by a first T1 signal and terminated by the following T1 signal 1.2 microseconds later. Likewise, the odd phases ($E_1$, $E_3$ and $E_5$) are turned on by a T2 signal and turned off by the next following T2 signal.

The output lines from the ring counter 68 are connected to corresponding input terminals of a cycle counter 82. The function of the cycle counter is to combine the timed signals from the clock driven ring counter 68 with the output from the Z-register and $Z_L$-register translator so as to break down the computer's computation process into certain well-defined cycles. It should be recalled that the left half of the Z-register ($Z_L$) contains the operation code portion of the instruction word. For the various operations specified by the permutations of the bits comprising the operation code, only certain predetermined cycles of computation are allowed to take place. For example, during a first cycle, a new instruction may be acquired from the memory and the contents of the program address register 12 (FIG. 1) may be incremented. Subsequently, during a second cycle time any address modification that may be specified by the instruction then in the Z-register is permitted to take place. When the instruction being executed is a square root instruction, it is during cycle 3 that the $Z_R$ and $A^*_R$-registers are loaded with the values ¼ and ¾, respectively. During cycle 4 of the square root computation, the initial subtraction step is performed with the difference being temporarily stored in the left half of the $A^*$-register. During cycle 5, the most significant bit of the $A^*$-register is examined to determine whether the subtraction performed on the preceding cycle produced an overdraft. Also during the fifth cycle of the computation, the requisite shifting operations are carried out and the final addition of the contents of $Z_R$ and the M-register is performed, either with or without carry propagation. Cycles 4 and 5 are repeated over and over until the constant initially loaded in the $A_{R^*}$-register has been shifted the full length of the $A_{R^*}$-register. Each time cycles 4 and 5 are repeated, an additional place or significant digit is added to the answer being developed in the $Z_R$-register.

While the square root instruction requires all five cycles for its execution, other operations performed by the computer may omit one or more of the five cycles. For example, the computer in which the present invention is employed performs a single length addition using the basic cycles 1 and 2 and a cycle 3 which is unique to the Add instruction. The output from the Z-register translator on the lines 84 through 92 determine which of the five cycles will be employed in carrying out the instruction contained in the instruction register.

The output signal from the clock 62, from the ring counter 68, and from the cycle counter 82 are combined in predetermined fashions in other control circuits to provide the command enables needed for gating information and operands between the various registers and arithmetic circuits of the computer. These various control circuits are shown in block diagram form in FIG. 3 and include the Shift Control 94, the M, S & P Registers Control 96, the Accumulator Control 98 and the Adder Control 100.

The output lines from these control circuits go to the gates associated with the various registers of the computer shown in FIG. 1 and serve to control the transmission of information between registers. Because the present invention is concerned with the manner of extracting the square root of an operand, only those command enables associated with the square root operation are shown. It should be understood, however, that in the computer itself, many more command enable lines are provided for carrying out various other functions, such as addition, subtraction, multiplication and division called for by other instructions.

As an aid in understanding the operation of the control circuit illustrated in FIG. 3, particular consideration will be given to the Shift Control circuit 94 since it is exemplary of the function performed by the others. It may be recalled that during cycle 5 of the execution of the Square Root instruction, the contents of the left half of the A-register ($A_L$) are shifted left by first transmitting the signals by way of the cable 34 to the $A^*_L$-register and by subsequently returning the signals to the $A_L$-register by way of cable 42. Similarly, the contents of $A_R$ are shifted right one place by transmitting the signals to the $A^*_R$-register by way of cable 40 and by subsequently returning the shifted signals to the $A_R$-register by way of cable 44. It is the function of the Shift Control circuit 94 to produce the desired command enables at the proper time in the computational process when the signals are needed. In this regard, it is only when the next signal T2 following the positive signal E1 is positive during cycle 5 of the square root computation that the command enables

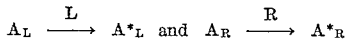

are generated. More specifically, the Shift Control circuit 94 receives T2 signals by way of conductors 66, 102, 104, and 106. Similarly, the Shift Control circuit receives an E1 pulse by way of conductors 70, 108, 110, and 112. During cycle 5, a positive signal is transmitted by way of conductor 114 to this control circuit. Also, when a Square Root instruction is contained in the Z-register, the translator provides an output signal on the conductor 116 which passes by way of conductor 118 to another input of the control circuit 94. These signals are logically ANDed together such that the command enable signal itself is generated at the time $T_2$ during cycle 5 of a square root instruction following the simultaneous positive signals $T_1$ and $E_1$. That this is true can be verified from the timing diagram of FIG. 4 by examining the relative position of the command enable signals with respect to the clock output and ring counter output.

In the same manner that the Shift Control circuit receives inputs from the clock, the ring counter, the cycle counter, and the Z-register and translator to produce command enable signals for performing the shift function, the other control circuits 96, 98, and 100 also receive timing signals from same devices and combine them in such a way that the desired command enable signals are produced at the appropriate time in the computational process for effecting the extraction of the square root of an operand. The "appropriate time" for each command enable is clearly illustrated in the timing diagram of FIG. 4.

Before going into the details of the various control circuits of FIG. 3, a brief description of the symbology and the basic logical building blocks employed therein will be given.

Referring to FIG. 5, there is shown the symbol employed to represent the basic logical building blocks utilized in the circuitry of the computer employing the present invention. The block 120 represents an OR INVERTER often referred to in the art as a NOR circuit. The OR INVERTER may have a plurality of input terminals such as A and B and a single output terminal such as C. As is indicated in the truth table of FIG. 6, if a negative signal is applied to one or more of the input terminals A and B, the signal appearing at the output terminal will be positive. Only when all of the inputs are simultaneously positive will a negative signal appear at the output terminal C.

In FIG. 8, there is shown a circuit for implementing the OR INVERTER or NOR logic. Since other circuits can be devised for performing this type of logic, the circuit illustrated schematically in FIG. 7 is only typical and limitation thereto is not intended. In the apparatus of the present invention, a positive signal is represented by a potential of approximately 0 volt while a negative signal is represented by a potential of about —3 volts. When a positive signal is present on one or more of the input terminals 122 through 126, and no negative signals are present on any of these input terminals, junction 128 in the circuit diagram is maintained slightly positive by means of the voltage source $+V_1$ and the voltage divider comprised of resistors 130, 132 and 134. Since the base of transistor 136 is positive with respect to its emitter electrode (maintained at ground potential), the emitter junction is biased in the reverse direction and therefore the impedance between its emitter and collector is relatively high. The collector junction is always reversed biased by means of the voltage source $-V_1$, thus current will flow across the collector junction only when the bias is reversed on the emitter junction. (For the purpose of this explanation, leakage currents are ignored.) The output line 138 is held at the —3 volts ($V_2$) level representing a relatively negative signal by the clamping diode 140 connected to the $-V_2$ supply.

If a negative signal is applied to one or more of the input terminals 122 through 126, the base of transistor 136 becomes negative with respect to its emitter. Hence, a relatively large current can now flow between the emitter and collector, such that the output voltage rises to almost ground or the 0 volt level, representing a positive signal. While only three input terminals are illustrtaed in the schematic diagram of FIG. 7, it should be understood that a greater or fewer number may be employed. Also, the output of this circuit may be fanned out so as to drive the inputs of several other similar NOR circuits.

FIG. 8 indicates the manner in which two NOR circuits of the type described above may be interconnected to obtain a bistable multivibrator or flip-flop. Normally positive signals are held on the "CLEAR" and "SET" lines 142 and 144, respectively. In order to erase the information held in the flip-flop stage and to introduce new information therein, a "CLEAR" signal is used. "CLEAR" means to place a negative signal on the CLEAR line and "SET" means to place a negative signal on the SET line. After clearing the flip-flop, the output of the NOR circuit 146 is positive and the alternate output from NOR circuit 148 is negative.

The following step-by-step procedure explains how the inverters operate as a bit storage device or flip-flop. Assume that the flip-flop is originally cleared so that the NOR circuit 146 is outputting a positive signal on conductor 150. Its output is also applied as a positive input signal to the NOR circuit 148. If no signal is applied to the "SET" line 144, the NOR circuit 148 wil output a negative signal on its output line 152. This negative signal is fed back by means of conductor 154 to another input to NOR circuit 146. Hence, the negative CLEAR SIGNAL may be removed and the negative signal appearing on line 154 will hold the flip-flop in the cleared state. If now, however, a negative signal is applied to the SET input terminal 144, this signal will be inverted by the NOR circuit 148 such that a positive signal will be applied via line 154 to the NOR circuit 146. The output of NOR circuit 146 will therefore be a negative signal which, when applied as an input to the NOR circuit 148, holds the flip-flop in the SET condition even when the signal which was originally applied to the SET terminal 144 is removed. The signals which formerly appeared on lines 150 and 152, are reversed upon application of the SET signal. When the flip-flop is set, the arbitrarily defined "1" side thereof outputs a positive signal while the "0" side outputs a negative signal. Similarly, when the flip-flop is cleared, the "0" side outputs a positive signal while the "1" side thereof outputs a negative signal. To simplify the drawings, a flip-flop is represented therein by the symbol shown in FIG. 9 rather than by that shown in FIG. 8. Since the representation is not only conventional but self-explanatory, no further discussion of it is necessary.

With the symbology and functioning of the logical building blocks in mind, the details of a typical register used in the computer will be described. Because each of the other registers in the machine are quite similar to that shown in FIG. 10, it is felt to lie within the realm of ordinary skill in the art for one to construct these other registers once the operation and construction of the register of FIG. 10 is fully understood. As is shown in the block diagram of FIG. 1, the memory exchange register or M-register 20 serves as a temporary storage register during the transmission of information between the computer's memory and the other registers of the computer. For example, information may be transmitted to and temporarily stored in the M-register from the A-register 26 and from the input/output register (not shown).

In FIG. 10 the means for storing binary digit representing signals are the flip-flops such as flip-flops 156, 158 and 160. The dotted lines connected between stages $M_1$ and $M_{15}$ are intended to indicate that 13 other identical stages are also provided, but are not shown in order to simplify the drawings. Together then, the stages M0 through M15 are adapted to store a 16-bit word or operand. To transfer information from the A-register to the M-register, a plurality of NOR circuits such as circuits 162–166 are provided (there is a corresponding NOR circuit for each stage) operating as coincidence gates for controlling the transmission of information between two interconnected registers. A command enable must be applied to the bus 168 to partially enable the gates 162 through 166 in order to transmit information from the A-register to the M-register. This command enable is a positive signal so that if the signals coming from the individual stages of the A-register are also positive, the gates 162 through 166 will be fully enabled and will transmit negative signals through the OR circuits 170, 172 and 174 to the CLEAR terminal of the M-register flip-flop. If instead, the input from the A-register to one or more of the NOR circuits 162–166 is a negative signal, the gates receiving the negative signal will not be fully enabled and will not produce a signal of the type which will cause the state of the M-register to be changed.

It can be seen then when information is contained in the A-register it may be transmitted to the M-register by supplying a command enable to the bus 168.

During the readout of a word from the memory, the line 176 receives a positive going signal to partially enable the NOR circuits 178, 180, and 182. The output signals from the memory sense amplifiers then pass through these last-mentioned gates provided the particular bit in question is also a positive signal. If, on the other hand, the signal applied to the other input of each of these last-mentioned gates is a negative signal, the output from the gates will not be of the requisite polarity to switch the state of the flip-flops 156 through 160. It can be seen then, that the information read out from the memory may then be gated into the M-register by the application of a command enable on the bus 176.

When it is desired to transfer information from an external device (not shown) to the memory, the information must first be loaded into the M-register until the memory read cycle can be initiated and the information transferred thereto. The loading of the data from the external device into the M-register occurs when a positive signal is applied to the bus 184. This signal, when applied to this line, is the command enable I/O→M. It can be seen that a positive signal on this line partially enables each of the gates 186, 188 and 190. Depending on the polarity of the signals applied to the other inputs of these last-mentioned NOR circuit gates, they will or will not produce an output signal to set the individual stages of the M-register. More specifically, it is only when both of the input signals to one of the gates 186 through 190 are positive that a negative signal will be developed at the output to pass through the OR circuits 192 through 196 to set the M-register flip-flops.

When it is desired to clear out the contents of the M-register stage 156 through 160 the command enable CLEAR M must be applied to the bus 200. This negative signal passes through each of the OR circuits 170, 172 and 174 to the CLEAR terminal of the individual stages. Similarly, when it is desired to set each stage of the flip-flop to the "1" stage it is only necessary that a negative signal be applied to the bus 198. This signal will pass through the OR circuits 192, 194, and 196, to the SET terminal of the flip-flops 156, 158, and 160, respectively.

When it is desired to transmit information from the M-register to some other register connected thereto, a command enable signal must be applied to the particular control line for that other register. The information present on the output lines 202 through 212 may then pass through the gates to which this control line is connected and be loaded into this other register. For example, when it is desired to add the contents of the M-register to some other operand already being applied to the adder input, a command enable M→ADDER is applied to a control line associated with the input gates for the adder which opens selected gates, permitting the signals on the lines 204, 208 and 212 to be transferred thereto. On the other hand, when it is desired to subtract some quantity in the M-register from another operand contained in the adder the command enable signal gate $\overline{M}$→ADDER is applied to another control line associated with the adder such that the complement output from the M-register appearing on the lines 202, 206, and 210 will be gated to the adder. To form the two's complement of the number in the M-register, a carry signal is forced into the least significant stage of the adder at the same time that the quantity $\overline{M}$ is gated thereto.

Now that the operation and construction of a typical register has been described, consideration will next be given to the operation of and construction of the circuitry used to implement the various control circuits illustrated in FIG. 3.

FIGURE 11 illustrates in block diagram form the circuitry for implementing the Shift Control circuit 94 of FIG. 3. The heart of this control circuit is the Shift flip-flop 214. When this flip-flop is set, the output from the "1" side thereof is positive and, hence, when the clock pulse T2 also goes positive, NOR circuit 216 will output a negative signal which will be inverted by the NOR circuits 218 to provide a positive command enable signal on the conductor 220. This signal is applied to the gate circuits in the cable 34 to cause a left shift of the operand contained in the A-register as it is transmitted to the A*-register. Likewise, when the Shift flip-flop 214 is set at the time that the clock pulse T2 is positive during a square root operation, the NOR circuit 222 will be fully enabled and will output a negative signal which is inverted by the NOR circuit 224 causing a positive signal to appear on the output conductor 226 thereof. This last mentioned signal is the command enable $$A_R \xrightarrow{R} A^*_R$$

In order to set the flip-flop in the first place it is necessary that the T1, E1, and cycle 5 signals be simultaneously positive and that the Z-register translator be outputting a signal indicative of the square root operation. Provided these conditions are satisfied, the NOR circuit 228 will be fully enabled and will output a signal for setting the flip-flop. The Shift flip-flop will remain set during cycle 5 until the signal E4 is generated at the output of the ring counter. This signal will be inverted by NOR circuit 230 and applied to the CLEAR terminal of the Shift flip-flop. It may be noted that the Shift flip-flop 214 will be set during cycle 5 of a square root operation when the clock signal T1 is positive and the signal E1 from the ring counter is also positive. However, the command enable signals on the conductors 220 and 226 will not be generated until the following T2 clock periods after the setting of the Shift flip-flop. It is not until this time that the gates 216 and 222 are fully enabled.

Figure 12:
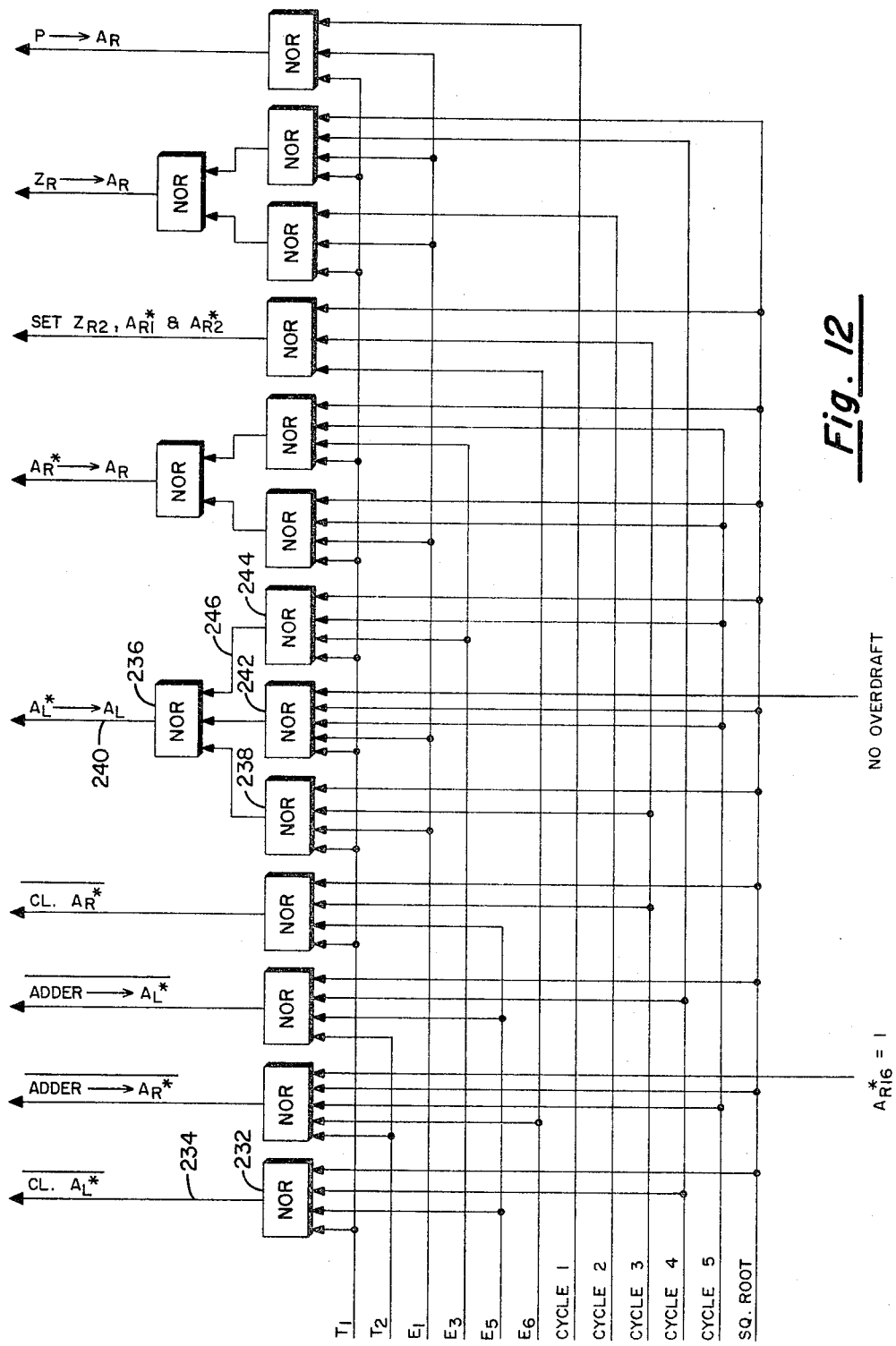
FIG. 12 is a more detailed block diagram of the Accumulator Control circuit of FIGURE 3.

FIGURE 12 illustrates in block diagram form the circuits comprising the Accumulator control 98 of FIG. 3. As is illustrated in FIG. 12, the various command signals are generated by properly combining the output signals from the clock, the ring counters, the cycle counter and the Z-register translator. As an example of the operation of the circuits of FIGURE 12, consider the command enable $\overline{\text{CLEAR } A^*_L}$. This signal is produced at the output of the NOR circuit gate 232. This command enable is generated at the time during cycle 4 of the square root computation that the signals T1 and E5 are present. Under this condition all of the inputs to the NOR crcuit 232 are positive causing a negative signal to appear on its output conductor 234. This signal is again inverted and applied to the CLEAR terminal of the A*$_L$-register to reset all stages of the left half of the A*-register to the "0" state. As another example of the operation of the Accumulator control circuits of FIGURE 12, consider the generation of the command enable $A^*_L \rightarrow A_L$. This command enable is generated at the output of the NOR gate 236. There are several different conditions which can be satisfied in order to generate this command enable. First of all, when the NOR gate 238 has all of its input terminals maintained positive, it will output a negative signal to the NOR circuit 236 causing a positive signal to appear on the output conductor 240. It is this last-mentioned signal which is actually the command enable for transferring the contents of the left half of the A*-register to the left half of the A-register. Only when the signals T1 and E1 are positive during the third cycle of the square root computation will NOR circuit 238 be fully enabled to cause the generation of the command enable. The same command will also be generated during cycle 5 of the square root computation when the signals T1 and E1 are positive, provided stage A*$_{L0}$ is cleared indicating that no overdraft occurred during the subtraction step of the process. Under these last-mentioned conditions, the NOR gate 242 will be fully enabled and will output a negative signal to the gate 236.

The command $A_L* \rightarrow A_L$ will also be generated during cycle 5 of the square root process when T1 and E3 are positive signals. When such is the case the NOR gate 244 is fully enabled and provides a negative signal on the line 246 which is connected to a third input of the NOR gate 236.

It is felt with the explanation of the generation of the command enables $\overline{\text{CLEAR } A_L*}$ and $A^*_L \rightarrow A_L$ in mind, one of ordinary skill in the art will be readily able to determine the manner in which the other command enables listed at the top of FIG. 12 are generated. Hence, further discussion of the operation of the circuits of FIGURE 12 is deemed to be unnecessary.

Figure 13:
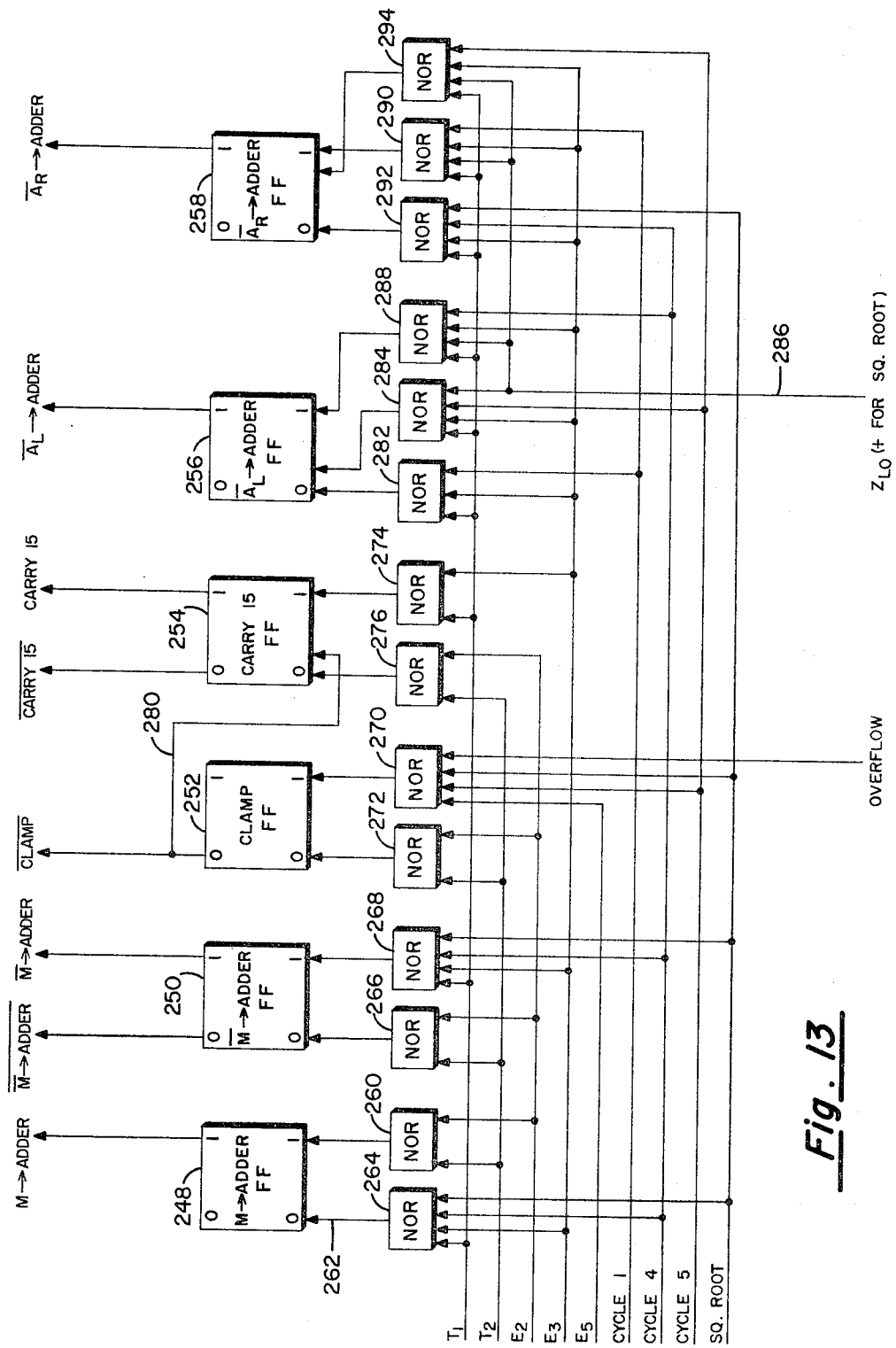
FIG. 13 is a more detailed block diagram of the Adder Control circuit of FIGURE 3.

FIG. 13 illustrates the manner in which the basic NOR circuit building blocks may be arranged to implement the Adder Control circuit 100 of FIG. 3. As before, only those circuits of the Adder Control which are utilized in carrying out the square root extraction process are illustrated. It should be understood, however, that in the actual computer embodying the square root instruction of this invention other circuits are provided for generating the particular command enables required for carrying out other arithmetic and logical processes. It may be seen that the control circuit of FIG. 13 is comprised of a plurality of flip-flop circuits 248 through 258 as well as a requisite number of NOR circuits which act as gates to control the setting and clearing of these flip-flops in accordance with predetermined timing arrangements.

Referring to the flip-flop 248, it can be seen that the M→ADDER command enable is generated whenever this flip-flop is set. The SET terminal of this flip-flop is supplied with signals from the NOR gate 260. When the T2 output from the clock and the E2 output from the ring counter are both positive, the NOR circuit 260 will be fully enabled and will produce a negative signal for setting the flip-flop. Since the T2 and E2 signals are generated during each cycle, the command enable M→ADDER is also generated during each cycle. Therefore, during cycle 4 of the square root computation the M→ADDER flip-flop will be set. It remains set only until it is cleared by the application of a negative signal to the CLEAR terminal 262 by way of gate 264. During cycle 4 of the square root computation when the signals T1 and E1 are simultaneously positive, the NOR gate 264 will output the negative signal for clearing the M→ADDER flip-flop. The command enable itself is generated at the output of the SET side of the flip-flop 248.

The command enable $\overline{M}$→ADDER is generated when the $\overline{M}$→ADDER flip-flop 250 is set. This occurs during cycle 4 of the square root computation when the signals T1 and E3 are simultaneously positive. It remains set until it is subsequently cleared during the fifth cycle when the signals T2 and E2 become positive, causing the NOR circuit gate 266 to produce a negative signal at the CLEAR terminal of the flip-flop 250. Like the NOR circuit 264, the NOR circuit 268 combines the T1, E3, and cycle 4 signals with the square root signal coming from the Z-register translator. Only when these last mentioned signals are all positive will NOR circuit 268 produce a negative signal for setting the flip-flop 250.

The command enable $\overline{\text{CLAMP}}$ is produced at the output of the CLAMP flip-flop 252. This flip-flop is set when the NOR gate 270 produces a negative output. This happens during the square root cycle when the signal E5 is positive during cycle 5 provided stage A*$_{L0}$ is in a condition indicating that an overflow has occurred. It may be recalled that the stage A*$_{L0}$ is used to store the sign bit of a number for indicating whether the number is a positive or a negative quantity. Once the flip-flop 252 is set it will be cleared on the next cycle when the signals T2 and E2 are both positive. When such is the case, the NOR circuit 272 outputs a negative signal for clearing the CLAMP flip-flop.

The flip-flop 254 is termed the CARRY 15 flip-flop and it is used during a subtraction process to force a 1-bit into the least significant digit position of the adder at the same time that the complement of the contents of the M-register are transferred to the adder. Those skilled in the art will recognize that when the digit one is added to the complement of a number, the so-called two's complement of that number is formed. The CARRY 15 flip-flop 254 is set once during each cycle at the particular time when the signals T1 and E3 are both positive. It is at this time that the NOR circuit 274 is fully enabled to produce the requisite negative signal for setting the flip-flop. The CARRY flip-flop will be cleared on the next succeeding cycle at the time when the signals E2 and T2 are both positive. When such is the case, the NOR circuit 276 is fully enabled and outputs a negative signal to clear the flip-flop. If the flip-flop is set and a $\overline{\text{CLAMP}}$ signal is developed on a conductor 280, which happens when the CLAMP flip-flop 252 is set, the resulting negative signal will also clear the CARRY flip-flop.

The $\overline{A}_L \rightarrow$ADDER flip-flop 256 is the means employed to generate the command enable $\overline{A}_L \rightarrow$ADDER. This command enable is applied to a first input terminal of a set of gates associated with the input to the adder. Another terminal of each of these gates receives an input from the complement side of the individual stages of the $A_L$-register. Hence, when a command enable is present either a positive or a negative signal will pass the gates depending upon the state of the particular A-register flip-flop in question.

Once the flip-flop 256 is set, it is cleared at two predetermined times during the execution of instructions. The flip-flop is initially cleared during cycle 1 at the time that the T1 and E3 signals are positive. It is at this time that the NOR circuit 282 outputs a negative signal to the CLEAR terminal of the flip-flop 256. Also, during cycle 5 of the square root instruction at the time when the clock signal T1 is positive and the ring counter is outputting a E3 signal, the NOR circuit 284 will produce a negative signal which is also connected to the CLEAR terminal of the $\overline{A}_L \rightarrow$ADDER flip-flop 256. The input to the NOR circuit 284 on conductor 286 comes from the "1" side of the lowest-order stage of the $Z_L$-register. It may be recalled that the left half of the Z-register is arranged to store the operation code portion of the instruction words. In the computer of the present invention, the instruction operation code for a square root instruction is such that stage $Z_{L0}$ is set. Hence, whenever the instruction being executed is a square root instruction a positive signal is applied to the conductor 286. Certain other instructions not relative to the present discussion also will cause bit $Z_{L0}$ to be set.

The setting of the $\overline{A}_L \rightarrow$ADDER flip-flop 256 is accomplished whenever the NOR circuit outputs a negative signal. This, of course, occurs only when the NOR circuit 288 is fully enabled by having positive signals applied to all of its input terminals. As can be seen from FIG. 13, the NOR circuit 288 receives a T1 input from the clock an input from stage 3 of the ring counter, an input from stage 4 of the cycle counter (indicative of cycle 4) and an input from the lowest-order stage of the Z-register ($Z_{L0}$). It can be seen that the $\overline{A}_L \rightarrow$ADDER flip-flop 256 will be set during cycle 4 and cleared again during cycle 5 when a square root instruction is being executed.

The final command enable to be generated by the adder control circuits of FIG. 13 is $\overline{A}_R \rightarrow$ADDER. This signal is generated when the flip-flop 258 is set. During cycle 1 when the signals T1 and E3 are both positive the NOR circuit 290 will output a negative signal to set the flip-flop 258. It may be recalled that it is during cycle 1 that an instruction is acquired from the memory and the program address register of P-register is incremented. It is during this incrementation process that the contents of the $A_R$-register are transmitted to the adder. More specifically, during cycle 1 the next instruction is read from memory into the M-register and from there is transferred to the instruction register Z. At this same time the contents of the program address register are transferred to the right half of the A-register and from there are switched into the adder. The carry flip-flop 254 then produces a carry signal which when inserted into the lowest-order stage of the adder causes the digit 1 to be added to the address formerly contained in the Z-register. Subsequently, the contents of the adder are returned to the P-register.

On the following cycle 4, of the square root instruction when the signals T1 and E3 are positive, the NOR circuit 292 will output a negative signal to again clear the $\overline{A}_R \rightarrow$ADDER flip-flop 258. Then during cycle 5 of the square root extraction process, the NOR circuit 294 produces a negative signal to again set the flip-flop 258. It may be recalled that it is during cycle 5 that the contents of $A_R$ and the M-register are added to form either the true sum or the logical sum, the results being transferred to the right-half of the Z-register. This completes the description of the construction and operation of the Adder Control circuits. The next control circuit to be considered is that which controls the transfer of information into and out of the M, S and P-registers.

Figure 14:
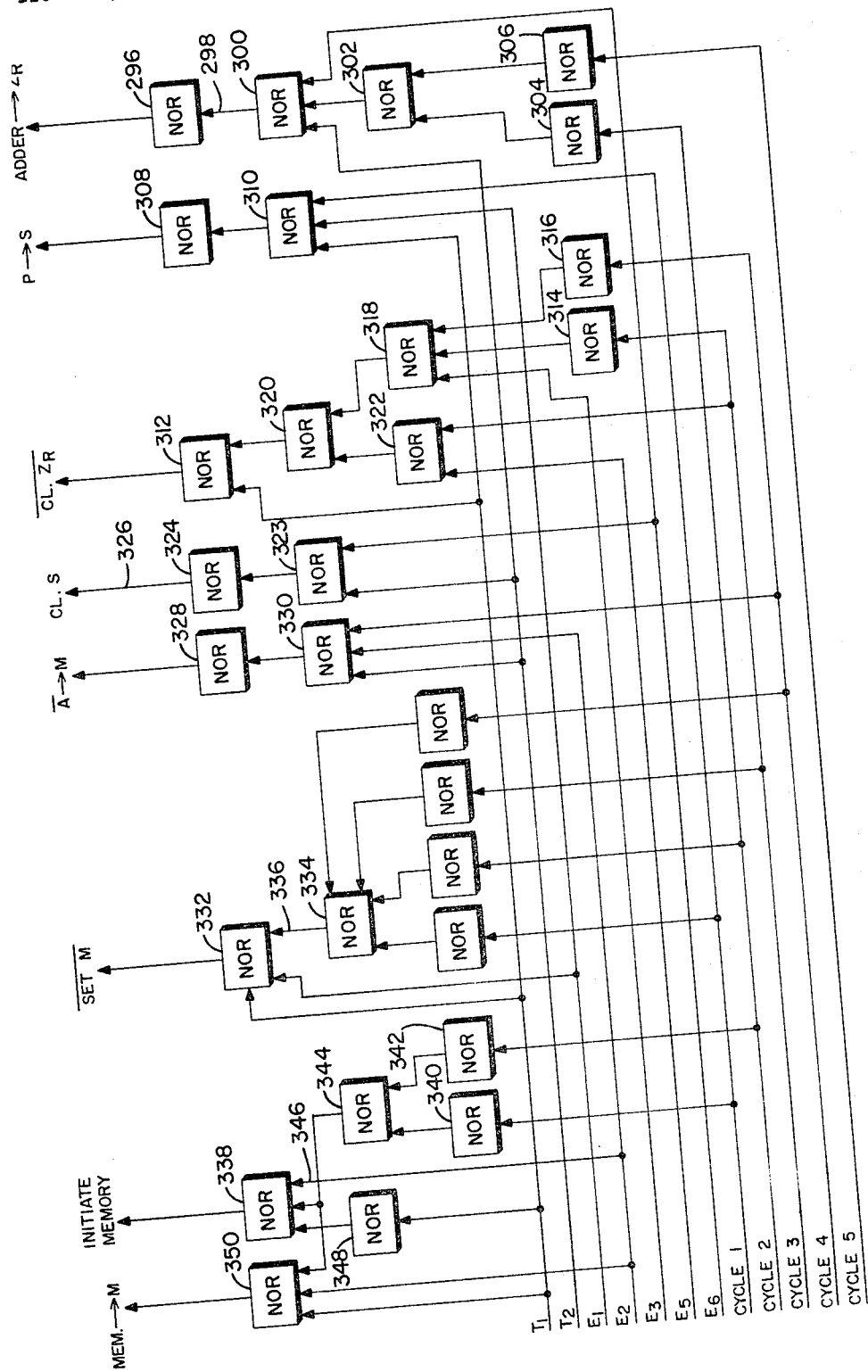
FIG. 14 is a more detailed block diagram of the M, S & P-register Control of FIGURE 3.

In FIG. 14 there are shown the individual circuits used to generate the command enable signals produced by the M, S and P-Registers Control circuit 96 of FIG. 3. The first command enable to be considered is that employed to permit the transfer of information from the adder to the right half of the Z-register, ADDER$\rightarrow Z_R$. This signal is produced at the output of an inverter 296. This inverter has only a single input which is connected by way of conductor 298 to the output of a NOR circuit gate 300. An examination of FIG. 14 shows that the NOR gate 300 will be fully enabled at the time that the signals T2 from the clock and E6 from the ring counter are positive, and when the NOR gate 302 is receiving at least one negative input. It can also be seen that during either cycle 2 or cycle 5 this last mentioned condition will be satisfied since one or the other of the inverters 304 and 306 will be producing negative signals at these times. To summarize then, the command enable ADDER$\rightarrow Z_R$ is produced during cycles 2 and 5 at a time when the signals T2 and E6 are both positive.

The command enable for transferring the information in the program address register, P, to the storage address register, S, appears at the output of inverter 308 at a time when all of the inputs to the gate 310 are positive. An examination of FIG. 14 immediately shows that this condition is satisfied during cycle 1 when the clock signal T1 and the ring counter signal E1 are simultaneously positive. The effect of this command is to gate the address of the next instruction to be executed into the storage address register. Hence, when the memory is initiated, the instruction stored at the address now contained in the storage address register may be read out from the memory into the M-register. Subsequently, the instruction may be transferred from the M-register to the Z-register.

Before new information can be read into the Z-register it is necessary that the register first be cleared so that the incoming information will not be mixed with that already contained in the register thereby producing an erroneous group of signals. In other words, before a word is transferred to the register, it is necessary that the states of the register be in a predetermined condition (either all set or all cleared) so that it can later be determined exactly what particular word of information had been transferred thereto. In the case of the Z-register, the stages thereof are initially cleared prior to the transfer of information thereto. The signal for clearing the right half Z-register appears at the output of the NOR circuit 312. This signal is generated during cycle 1 prior to the transmission of the new instruction from the M-register to the Z-register. Also, during cycle 2 the Z-register is cleared prior to the time that the modified address is gated from the adder to the Z-register. The signal is also generated during cycle 3 of the square root instruction prior to the time that the constant ¼ is initially loaded into the right half of the Z-register. Finally, during cycle 5 of the square root operation, the signal CLEAR $Z_R$ is generated prior to the time that the contents of the adder (the true sum or the logical sum of $A_R$ and M) is transmitted to the right half of the Z-register. In each instance, the CLEAR $Z_R$ signal is generated at a time that the T1 output from the clock is positive.

During cycles 1, 2, and 5 the output from the NOR circuits 314 and 316 will be positive since the output from stages 3 and 4 of the cycle counter will be negative at this time. Hence, at the time when the output from stage 3 of the ring counter (E3) is positive, the NOR circuit 318 will be fully enabled and will output a negative signal to the circuit 320. Circuit 320 inverts this negative signal causing a positive signal to be applied to the input terminal of gate 312. Hence, at the time when the T1 signal goes positive, NOR circuit 312 will output the requisite command enable for clearing the register.

During cycle 3 at the time that stage 5 of the ring counter is set, the NOR circuit 322 will be fully enabled and will cause negative signal to be applied to the circuit 320. Again, this causes a positive signal to be applied to the gate 312. When the signal T1 goes positive, the gate 312 will now produce the command enable for clearing the right half of the Z-register. During cycle 4, however, one of the inputs to the NOR circuit 318 wil be negative, i.e., the output from NOR circuit 316, such that both inputs to the NOR circuit 320 will be positive. Under this condition, the signal appearing at the output of NOR circuit 320 will be negative and will inhibit the generation of the clear signal.

The next command to be considered is that for clearing the S-register. This function is performed once during each cycle at the time when the T2 signal from the clock is positive and stage 6 of the ring counter is set. It is at this time that the NOR circuit 323 is fully enabled and outputs a negative signal to the input of the inverter 324. The resulting signal from the inverter appearing on conductor 326 is again inverted and is the signal, which when applied to the CLEAR terminal of each stage of the S-register, serves to reset each stage of the S-register.

The signal for transferring the contents of the A-register to the M-register is produced at the output of the inverter 328 at the particular time during cycle 4 that the clock signal T2 and the ring counters signal E2 are simultaneously positive. It is at this time that all of the signals applied to the NOR gate 330 are positive such that this gate is fully enabled to produce the command $\overline{A \rightarrow M}$.

The command enable $\overline{SET\ M}$ is a signal, which when applied to the M-register, causes each stage of this register to be set. This is done each cycle prior to any transfer of information to the M-register so that each stage of the register will be in a reference state. Hence, the information signals subsequently loaded into the M-register are prevented from becoming mixed with the information previously contained therein. The command $\overline{SET\ M}$ is generated at the time that all of the inputs to the NOR circuit 332 are simultaneously positive. An examination of FIG. 14 shows that this happens during cycles 1, 2, 3, and 4 at the time that the signals T1 and E1 are positive. During each of the aforementioned cycles, one of the inputs to the NOR circuit 334 will be negative so that a positive signal will be applied by way of conductor 336 to the gate 332. During cycle 5, however, all of the inputs to NOR circuit 334 will be positive, causing to it output a negative signal to the gate 332. Because of this negative signal, this last mentioned gate is inhibited and the command enable cannot be generated.

In order to read a word into or out of the memory section of the computer it is necessary to initiate the memory timing chain (not shown). The memory timing chain is a separate device for producing the requisite signals for operating the memory. Because the memory operation is not of particular significance in the understanding of the present invention, it is felt to be unnecessary to describe in detail the various circuits employed in the memory section of the computer. At any rate, the signal which starts the memory timing chain running is the command enable INITIATE MEMORY produced at the output of the NOR circuit 338.

From the timing diagram of FIG. 4 and also from the circuit diagram of FIG. 14, it can be seen that the signal initiate memory it produced during cycles 1 and 2 during the time that the signal from the ring counter E2 is positive, but not when the signal T1 is positive. More specifically, during cycles 1 and 2, one or the other of the NOR circuits 340 or 342 will be outputting a negative signal to one of the inputs of the circuit 344. Hence, the output of circuit 344 during cycles 1 and 2 must be positive. At the time that the ring counter is set to its stage E2, a positive signal appears on conductor 346. When the T1 signal from the clock is positive, however, NOR circuit 348 is outputting a negative signal which inhibits circuit 338 from producing the initiate memory command enable. However, during cycles 1 and 2 when the T1 signal from the clock is no longer positive the gate 338 will be fully enabled to produce the requisite signal for starting the memory timing chain.

The final command enable to be considered is the one employed to strobe the memory sense amplifiers for reading a word from the memory into the M-register. It is only necessary to read information from the memory during cycles 1 and 2 of the execution of the square root instruction. It may be recalled that it is during cycle 1 that the memory is referenced to obtain the next instruction and that during cycle 2 the memory is referenced to read out the contents of a selected B-box register for modifying the address porton of the instruction word read out during cycle 1. The circuit 350 will be fully enabled during cycles 1 and 2 when the signals T1 from the clock and E2 from the ring counter are simultaneously positive. The other input to the NOR circuit 350 comes from the output of the NOR circuit 344. As previously explained, the signal appearing on the output line of NOR circuit 344 is positive only during cycles 1 and 2. Hence, the command MEMORY→M will be generated only during these two cycles.

Now that all of the control circuits employed in the computer incorporating the square root instruction of this invention have been described in detail, consideration will next be given to an adder circuit which incorporate certain features found to be expedient in implementing the square root instruction.

Figure 15:
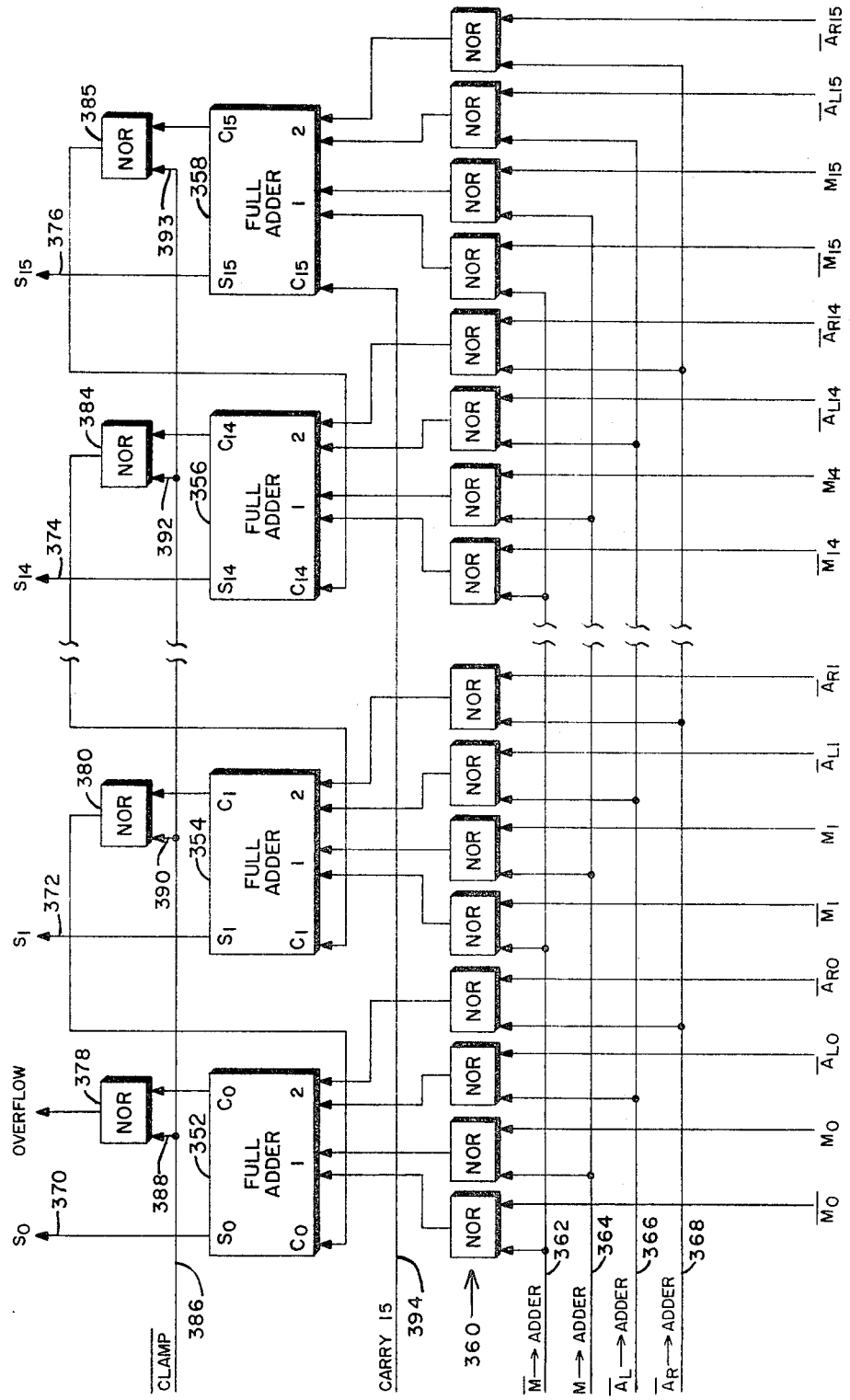
FIG. 15 illustrates one form of an adder which may be employed in the computer.

Referring now to FIG. 15 there is shown four typical stages of a 16-stage adder which may be used in the arithmetic section of the computer incorporating the square root algorithm. As is shown in this figure, the complete adder is comprised of a plurality of full adder stages 352 through 358 with the carry output of a full adder digit stage connected to the carry input of the next least significant digit stage and so on up the line. As is well known in the art, a full adder is a device which receives as inputs thereto the augend bit, the addend bit, and the carry bit which may result from the addition of the bits of the preceding adder stage. It combines these three binary digits or bits and produces at a first output terminal a signal representative of the sum of the previously mentioned three bits, and a carry signal at the other terminal when at least two of the inputs to the particular stage are binary "1" digits. Since many ways are known in the art for implementing the full adder circuits 352 through 358, it is felt to be unnecessary to go into detail in the explanation of these circuits. However, if necessary the reader may refer to pages 152–162 of the book entitled, "Computer Logic," by Ivan Flores published in 1960 by Prentice-Hall Inc., which explains in detail the logical design of a full adder circuit.

In FIG. 15, the addend and augend input terminals for each full added stage are labeled 1 and 2, respectively. As was already mentioned when the details of the block diagram of FIG. 1 were described, the adder is capable of receiving signals to be added from four different register locations. More specifically, signals to be added may be supplied from the right half of the A-register, from the left half of the A-register, from the M-register and from the complement side of the M-register. The NOR circuits 360 serve as gates for controlling the transmission of the addend and augend bits to the adder. The command enables for selectively applying the output from the four different locations to the input of the adder are applied to the gates 360 by way of the busses 362, 364, 366 and 368.

As an example of the operation of the adder of FIGURE 15, it may be recalled that during cycle 5 of the square root extraction process, the contents of the M-register are added to the contents of the right-half of the A-register, the result subsequently being gated to the right half of the Z-register. It may be recalled that at the time during cycle 5 that the signals T2 and E2 were both positive, the M→ADDER flip-flop 248 of FIG. 13 was set. Subsequently, when the signals T1 and E3 became positive during cycle 5 of the square root computation the $\overline{A_R}$→ADDER flip-flop 258 was also set. The output from these two flip-flops are applied by way of conductors 364 and 368 to certain gates 360 in the adder, causing the addend and augend bits to be inserted into the adder where they are properly combined to form a signal group representative of either the true sum or the sum modulo-2 of the input bits. This signal group appears on the output conductors 370 through 376.

The Sum Modulo–2 referred to above is a sum formed by combining only the addend and augend bits according to binary addition but neglecting the propagation of any carry signal resulting from this addition. The NOR gates 378 through 384 in FIG. 15 control the propagation of carries from one stage to the next. When the command enable $\overline{CLAMP}$ is developed at the output of the Adder Control circuit, a signal of a proper polarity to inhibit the NOR gates 378 through 384 is applied to these gates by way of the bust 386 and the conductors 388, 390, 392 and 393 connected thereto.

It may be recalled from the discussion of the operation of the Adder Control circuits that the generation of the $\overline{CLAMP}$ command enable is dependent upon the sign bit A* of the A*-register. When the subtraction which takes place during cycle 4 of the square root computation, causes an overdraft to occur, the clamp signal will be generated so that when the addition is performed during cycle 5, the signals representative of the Sum Modulo-2 will appear on the output conductors 370 through 376. On the other hand, if the subtraction which takes place during cycle 4 does not cause an overdraft, the NOR gates 378 through 385 will be fully enabled and the carry signals, if any, developed in a particular full adder stage will be permitted to propagate to the carry input terminal of the next full adder stage. It is to be understood that the carry clamp feature of the adder is not restricted to a simple serial carry propagation adder. It is shown as such here for simplicity of explanation. It is equally applicable to pyramid type adders wherein the adder stages are divided into groups with inter-group and intra-group carries being generated for propagation to higher ordered groups and stages.

The command enable, CARRY 15, which is applied by way of conductor 394 to the carry input terminal of full adder stage 358, is used during subtraction to form the two's complement of one of the operands to be inserted into the adder. For example, when it is desired to subtract the contents of the M-register from the contents of the left half of the A-register, a command enable signal is applied to bust 362 to gate the complement output from the M-register into the adder, to bus 366 to gate the contents of the left half of the A-register to the adder, and to the CARRY 15 conductor 394. This carry signal, when it is forced into the least significant digit stage of the adder, combines with the complement input from the M-register to form the two's complement of the quantity contained in the M-register.

During the course of some previous computation, the radicand, i.e., the operand whose root is being sought, is located in the left half of the A*-register 28 (FIG. 1). Upon the completion of the execution of the current instruction, the command enable P→S is executed such that the address of the next instruction is placed in the storage address register 14. At the same time, the command enables SET M, INITIATE MEMORY and MEMORY→M are generated by the control circuits causing the instructions stored at the memory location specified by the address in the S-register to be read out into the M-register 20. At the same time that this operation is taking place the contents of the program address register P are transferred to the right half 32 of the A-register via cable 56. Next, the contents of $A_R$ are transferred to the adder along with a CARRY 15 signal. As a result, the previous contents of the P-register are increased by one, the results being transferred back to the P-register. Also, during cycle 1 of the instruction execution, the Z-register 48 is cleared and the instruction which had previously been read from the memory into the M-register is transferred to the Z-register.

If the instruction contained in the Z-register at this time calls for an address modification, the command enables illustrated during cycle 2 in the timing diagram of FIGURE 4 are generated, causing the selected address modifier to be acquired from the memory. While the modifier is being acquired, the unmodified address is transferred to the right half of the A-register. Next, the unmodified address contained in $A_R$ is gated into the adder along with the address modifier now contained in the M-register. The sum $(M+Z_R)$ is subsequently transferred from the adder to the right half 50 of the Z-register.

It can be seen then, that during cycles 1 and 2 the commands needed for first reading out the next instruction and for subsequently modifying the address portion thereof are executed if address modification is called for. While the commands generated during cycles 1 and 2 are common to all of the instructions, the following three cycles, namely, cycles 3, 4, and 5, are unique to the square root instruction. It should be understood, however, that many of the commands executed during cycles 3, 4, and 5 of the square root instruction may also be generated during the execution of the other instructions which the machine is capable of handling. In other words, the circuitry employed for extracting the square root may also be used for performing other instructions. In fact, one of the chief advantages of the square root instruction described herein is that very little in the way of additional hardware over that already required for performing the normal arithmetic functions commonly found in present day computers, is required to implement the square root instruction.

Returning now to the description of the system operation when operating in a square root mode, during cycle 3 when the signals T1 and E1 are simultaneously positive the command enables A*0→SIGN F.F. and A*$_L$→A$_L$ are generated. The first of these commands places the SIGN flip-flop in one or the other of its two stable states. It should be recalled that A*0 is the stage of the A*-register holding the sign bit. If this stage is cleared the number contained in the A*-register is in positive quantity, whereas if the stage is set, the number contained in the $A^*$-register is a negative quantity. This test is initially made since the square root of a negative number would produce an imaginary number for a result.

The command $A^*_L \to A_L$ is applied to the gates in the cable 42 (FIG. 1) and serves to load the radicand into the $A_L$ register. The next things to happen in point of time are that the right half of the Z-register ($Z_R$) is cleared. This readies the Z-register for a subsequent receipt of new information. At the same time that the Z-register is cleared the $A_{15} \to A^*_{16}$ flip-flop is cleared. The clearing of this flip-flop prevents bit 15 of the A-register from being transferred into bit 16 of the $A^*$-register during the shift sequence. This is due to the fact that in the square root extraction process the left and right halves of the A and $A^*$-registers are operated as if they were completely separate registers rather than simply one half of a complete register.

Following the clearing of the $Z_R$ stages, a command is also generated for clearing the $A^*_R$-register stages. Because these two registers are now in a condition to receive new information the commands for loading $A^*_R$ and $Z_R$ with the constants ¾ and ¼ respectively, are issued. This command is effective to set only stages 1 and 2 of the $A^*_R$-register and only stage 2 of the $Z_R$-register.

The first command to be issued during cycle 4 is the one for transferring the contents of $Z_R$ to the $A_R$-register. This places the trial root of ¼ in the $A_R$-register so that it may subsequently be transferred to the M-register. The transfer of this trial root from the A-register to the M-register occurs at the time during cycle 4 of the square root instruction that the signals T2 and E2 are simultaneously positive. The subtraction of the trial root of ¼ now contained in the M-register from the radicand contained in the $A_L$-register is performed during cycle 4 at the time that the signals T1 and E3 are positive. Referring to the timing diagram of FIG. 4, it can be seen that several commands are generated at this particular time. First of all, the $\overline{A}_L \to$ ADDER flipflop 256 of FIG. 13 is set. As has already been explained the setting of this flip-flop causes the command enable to be generated for gating the contents of the $A_L$-register to the adder. At the same time a signal CLEAR $\overline{A}_R \to$ ADDER is generated to inhibit the transmission of the right half of the A-register. The $\overline{M} \to$ ADDER flip-flop 250 is set next, which causes the complement of the contents of the M-register to be applied to the adder input gates. At the same time, the CARRY 15 flip-flop is set, causing the numeral 1 to be inserted into the lowest-order stage of the adder where it combines with the complement input from the M-register to form the two's complement of the quantity previously contained in the M-register. (Subtraction is performed in the adder by adding the 2's complement of the subtrahend to the minuend.) Following the subtraction step, the $A^*_L$-register is cleared, thereby preparing it for a subsequent receipt of information. This occurs during cycle 4 at the time that the signals T2 and E6 are positive when the command ADDER $\to A^*_L$ is generated. This command causes the difference representing signals appearing on the adder output lines 370 through 376 (FIGURE 15) to be gated into the left half of the $A^*$-register.

During cycle 5 of the square root extraction process, alternative events take place depending upon the outcome of the subtraction step performed during cycle 4. More specifically, a first set of operations take place if the subtraction step causes an overdraft such that a "1" digit appears in the $A^*0$ stage. However, if the subtraction step causes a "0" digit to be contained in the $A^*0$ stage another set of operations are executed. For example at the time during cycle 5 that the signals T1 and E1 are positive, the command $A^*_L \to A_L$ will be generated, provided the subtraction step produced an overdraft. The signal $A^*_R \to A_R$ will be generated independent of the status of the stage $A^*0$. When the T2 signal from the clock is positive, several "housekeeping" functions are performed. More specifically, the CARRY 15 flip-flop is cleared, and the $\overline{M} \to$ ADDER flip-flop is cleared. Also, the command enables are generated for shifting the contents of the $A_R$-register right one place and the contents of the $A_L$-register left one place. During the following time period, the shifted quantities are gated back via cables 42 and 44 of FIG. 1 to the A-register. This occurs at the time that the command enables $A^*_L \to A_L$ and $A^*_R \to A_R$ are generated. As can best be seen from the flow chart of FIG. 2, the next event to occur is the addition of the contents of the M-register and the contents of the right half of the A-register, the resulting carry signals being either clamped or not clamped depending on the state of stage $A^*0$. By examining the timing diagram of FIG. 4, it can be seen that during cycle 5 when the signals T1 and E3 are simultaneously positive, the flip-flop $\overline{A}_R \to$ ADDER is set, which causes the contents of the right half of the A-register to be transmitted to the adder input terminals. At the same time the $\overline{A}_L \to$ ADDER flip-flop is cleared which prevents this half of the register from communicating with the adder and thereby distorting or destroying the information which is to form one of the quantities to be added. Since the $M \to$ ADDER flip-flop was set previously during cycle 5, the two operands will be applied simultaneously to the adder inputs causing the sum Modulo-2 or the true sum to appear on the output lines 370 through 376 of FIG. 15. The CLAMP flip-flop 252 will be set provided there has been an overflow, i.e., stage $A^*0$ is set during cycle 3.

Next, a test is made to see whether the square root extraction process has been completed. A completion signal is generated when the least significant digit position of the $A^*$-register is set. This occurs when constant 11 which was initially set into stages 1 and 2 of the $A^*_R$-register, has been shifted the full extent of the $A^*$-register. Assuming that a completion signal is not generated during cycle 5, the adder output is gated to the Z-register at the time that the signals T2 and E6 are simultaneously positive. However, had a completion signal been generated, the sum representing signals would have been transmitted to the $A^*_R$-register, instead of to the $Z_R$-register. Cycles 4 and 5 are repeated over and over until the constant 11 has been shifted the full extent of the register and a completion signal is generated. It can be seen then that the execution of the square root instruction causes the square root of the number contained in the $A^*_L$-register to be computed with the results being transferred to the $A^*_R$-register.

This completes the description of the operation of the various circuits employed to implement the square root instruction of this invention. As an aid in understanding the operation of circuits and to show that when the operands are manipulated in accordance with the algorithm illustrated by the flow chart of FIG. 2, that the square root of a number does result, reference is made to the following example. In this example the problem is to find the square root of the fraction $^{49}/_{64}$ (0.1100010 binary).

During cycle 3, the initial setup is performed, the constant ¼ and the constant ¾ being inserted into the $Z_R$ and $A^*_R$-registers, respectively. During iterations 1 through 5 the various numbers are manipulated until the quantity 0.111000 remains in the right half of the Z-register. This number is the binary representation of the decimal fraction ⅞ which is the square root of the fraction $^{49}/_{64}$.

Thus, it can be seen that there is provided by this invention apparatus whereby the various objects and advantages set forth in the specification are successfully achieved. While the invention has been described with reference to the preferred embodiments thereof, it will be apparent that various modifications in other embodiments may occur to those skilled in the art without departing from the scope of the invention. Accordingly, it

| | Operation | Bit Positions Left | | | | | | | Bit Positions Right | | | | | | | |
|---|---|---|---|---|---|---|---|---|---|---|---|---|---|---|---|---|
| | | 0 1 | 2 | 3 | 4 | 5 | 6 | 7 | 0 1 | 2 | 3 | 4 | 5 | 6 | 7 | |
| Cycle 3 Initial Setup | Load $A_L$ | 0.1 | 1 | 0 | 0 | 0 | 1 | 0 | | | | | | | | |
| | $\frac{1}{4} \to Z_R$ | | | | | | | | 0.0 | 1 | 0 | 0 | 0 | 0 | 0 | |
| | $\frac{3}{4} \to A^*_R$ | | | | | | | | 0.1 | 1 | 0 | 0 | 0 | 0 | 0 | |
| | $Z_R - A_R \to M$ | 0.0 | 1 | 0 | 0 | 0 | 0 | 0 | 0.0 | 1 | 0 | 0 | 0 | 0 | 0 | |
| | $A_L - M \to A^*_L$ | 0.1 | 0 | 0 | 0 | 0 | 1 | 0 | | | | | | | | |
| | Sign test (+) | | | | | | | | | | | | | | | |
| | $A^* \to A$ | 0.1 | 0 | 0 | 0 | 0 | 1 | 0 | 0.1 | 1 | 0 | 0 | 0 | 0 | 0 | |
| Cycles 4 & 5 Iteration #1 | L | | | | | | | | | | | | | | | |
| | $A_L \to A^*_L$ | 1.0 | 0 | 0 | 0 | 1 | 0 | 0 | | | | | | | | |
| | R | | | | | | | | | | | | | | | |
| | $A_R \to A^*_R$ | | | | | | | | 0.0 | 1 | 1 | 0 | 0 | 0 | 0 | |
| | $A^* \to A$ | 1.0 | 0 | 0 | 0 | 1 | 0 | 0 | 0.0 | 1 | 1 | 0 | 0 | 0 | 0 | |
| | $A_R + M \to Z_R$ | | | | | | | | 0.1 | 0 | 1 | 0 | 0 | 0 | 0 | |
| | $Z_R - A_R \to M$ | 0.1 | 0 | 1 | 0 | 0 | 0 | 0 | 0.1 | 0 | 1 | 0 | 0 | 0 | 0 | |
| | $A_L - M \to A^*_L$ | 0.0 | 0 | 1 | 1 | 0 | 1 | 0 | | | | | | | | |
| | Sign test (+) | | | | | | | | | | | | | | | |
| | $A^* \to A$ | 0.0 | 1 | 1 | 0 | 1 | 0 | 0 | 0.0 | 1 | 1 | 0 | 0 | 0 | 0 | |
| Cycles 4 & 5 Iteration #2 | L | | | | | | | | | | | | | | | |
| | $A_L \to A^*_L$ | 0.1 | 1 | 0 | 1 | 0 | 0 | 0 | | | | | | | | |
| | R | | | | | | | | | | | | | | | |
| | $A_R \to A^*_R$ | | | | | | | | 0.0 | 0 | 1 | 1 | 0 | 0 | 0 | |
| | $A^* \to A$ | 0.1 | 1 | 0 | 1 | 0 | 0 | 0 | 0.0 | 0 | 1 | 1 | 0 | 0 | 0 | |
| | $A_R + M \to Z_R$ | | | | | | | | 0.1 | 1 | 0 | 1 | 0 | 0 | 0 | |
| | $Z_R - A_R \to M$ | 0.1 | 1 | 0 | 1 | 0 | 0 | 0 | 0.1 | 1 | 0 | 1 | 0 | 0 | 0 | |
| | $A_L - M \to A^*_L$ | 0.0 | 0 | 0 | 0 | 0 | 0 | 0 | | | | | | | | |
| | Sign test (+) | | | | | | | | | | | | | | | |
| | $A^* \to A$ | 0.0 | 0 | 0 | 0 | 0 | 0 | 0 | 0.0 | 0 | 1 | 1 | 0 | 0 | 0 | |
| Cycles 4 & 5 Iteration #3 | L | | | | | | | | | | | | | | | |
| | $A_L \to A^*_L$ | 0.0 | 0 | 0 | 0 | 0 | 0 | 0 | | | | | | | | |
| | R | | | | | | | | | | | | | | | |
| | $A_R \to A^*_R$ | | | | | | | | 0.0 | 0 | 0 | 1 | 1 | 0 | 0 | |
| | $A^* \to A$ | 0.0 | 0 | 0 | 0 | 0 | 0 | 0 | 0.0 | 0 | 0 | 1 | 1 | 0 | 0 | |
| | $A_R + M \to Z_R$ | | | | | | | | 0.1 | 1 | 1 | 0 | 1 | 0 | 0 | |
| | $Z_R - A_R \to M$ | 0.1 | 1 | 1 | 0 | 1 | 0 | 0 | 0.1 | 1 | 1 | 0 | 1 | 0 | 0 | |
| | $A_L - M \to A^*_L$ | 1.0 | 0 | 0 | 1 | 1 | 0 | 0 | | | | | | | | |
| | Sign test (−) | | | | | | | | | | | | | | | |
| | $A^*_R \to A_R$ | | | | | | | | 0.0 | 0 | 0 | 1 | 1 | 0 | 0 | |
| Cycles 4 & 5 Iteration #4 | L | | | | | | | | | | | | | | | |
| | $A_L \to A^*_L$ | 0.0 | 0 | 0 | 0 | 0 | 0 | 0 | | | | | | | | |
| | R | | | | | | | | | | | | | | | |
| | $A_R \to A^*_R$ | | | | | | | | 0.0 | 0 | 0 | 0 | 1 | 1 | 0 | |
| | $A^* \to A$ | 0.0 | 0 | 0 | 0 | 0 | 0 | 0 | 0.0 | 0 | 0 | 0 | 1 | 1 | 0 | |
| | $A_R + M \to Z_R$ | | | | | | | | | | | | | | | |
| | Clamp Carry | | | | | | | | 0.1 | 1 | 1 | 0 | 0 | 1 | 0 | |
| | $Z_R - A_R \to M$ | 0.1 | 1 | 1 | 0 | 0 | 1 | 0 | 0.1 | 1 | 1 | 0 | 0 | 1 | 0 | |
| | $A_L - M \to A^*_L$ | 1.0 | 0 | 0 | 1 | 1 | 1 | 0 | | | | | | | | |
| | Sign test (−) | | | | | | | | | | | | | | | |
| | $A^*_R \to A_R$ | | | | | | | | 0.0 | 0 | 0 | 0 | 1 | 1 | 0 | |
| Cycles 4 & 5 Iteration #5 | L | | | | | | | | | | | | | | | |
| | $A_L \to A^*_L$ | 0.0 | 0 | 0 | 0 | 0 | 0 | 0 | | | | | | | | |
| | R | | | | | | | | | | | | | | | |
| | $A_R \to A^*_R$ | | | | | | | | 0.0 | 0 | 0 | 0 | 0 | 1 | 1 | |
| | $A^* \to A$ | 0.0 | 0 | 0 | 0 | 0 | 0 | 0 | 0.0 | 0 | 0 | 0 | 0 | 1 | 1 | |
| | $A_R + M \to A^*_R$ | | | | | | | | 0.1 | 1 | 1 | 0 | 0 | 0 | 1 | |
| | Clamp Carry | | | | | | | | | | | | | | | | is desired that the scope of the invention be limited only by the appended claims.

What is claimed is:

1. In a digital computer, means for generating the square root of a number, comprising:

(a) a first register for initially storing said number and for subsequently storing partial results developed during successive cycles;

(b) a second register for initially storing a trial square root of said number and for subsequently storing the partially developed root of said number;

(c) a third register for initially storing a predetermined constant and for subsequently storing a multiple of said constant;

(d) arithmetic means for subtracting the contents of said second register from the contents of said first register, leaving the difference in said first register, and for producing an overdraft signal in the event that the contents of said second register exceeds the contents of said first register;

(e) means operative in the absence of said overdraft signal for shifting said difference one place toward the most significant digit position and for shifting the contents of said third register one place toward the least significant digit position;

(f) means including said arithmetic means operative in the absence of said overdraft signal for forming the sum of the shifted contents of said third register with the then contents of said second register in said second register;

(g) means responsive to the presence of said overdraft signal for shifting the contents present in said first register prior to the subtraction of the contents of said second register from the contents of said first register, one place toward the most significant digit position and for shifting the contents of said third register one place toward the most significant digit position;

(h) and means including said arithmetic means responsive to the presence of said overdraft signal for forming the Sum Modulo-2 of the contents of said second and third registers.

2. In a digital computer, means operative on successive cycles for generating the square root of a number, comprising:

(a) a first register for initially storing said number and for subsequently storing partial results developed during said successive cycles;

(b) a second register for initially storing a trial square root of said number and for subsequently storing the partially developed root of said number developed during said successive cycles;

(c) a third register for initially storing a predetermined constant and for subsequently storing a multiple of said constant;

(d) arithmetic means for subtracting the contents of said second register from the contents of said first register, leaving the difference in said first register, and for producing an overdraft signal in the event that the contents of said second register exceeds the contents of said first register;

(e) means operative in the absence of said overdraft signal for shifting said difference one place toward the most significant digit position and for shifting the contents of said third register one place toward the least significant digit position;

(f) means including said arithmetic means operative in the absence of said overdraft signal for forming the true sum of the shifted contents of said third register with the then contents of said second register in said second register;

(g) means responsive to the presence of said overdraft signal for shifting the contents present in said first register prior to the subtraction of contents of said second register from the contents of said first register, one place toward the most significant digit position and for shifting the contents of said third register one place toward the most significant digit position;

(h) and clamping means for said arithmetic means, responsive to the presence of said overdraft signal, for preventing carry signals developed during the addition of the said second and third registers from being propagated.

3. In a digital computer, means operative during successive cycles of computation for generating the square root of a number, comprising:

(a) a first register for initially storing said number and for subsequently storing partial results developed during said successive cycles;

(b) a second register for initially storing a trial square root of said number and for subsequently storing the additional significant digits of the partially developed root of said number developed during said successive cycles;

(c) a third register for initially storing a predetermined constant and for subsequently storing a multiple of said constant;

(d) means for subtracting the contents of said second register from the contents of said first register, leaving the difference in said first register, and for producing an overdraft signal in the event that the contents of said second register exceeds the contents of said first register;

(e) means operative in the absence of said overdraft signal for shifting said difference one place toward the most significant digit position and for shifting the contents of said third register one place toward the least significant digit position.

(f) means including said arithmetic means operative in the absence of said overdraft signal for forming the true sum of the shifted contents of said third register with the then content of said second register to generate an additional significant digit of said trial root in said second register;

(g) means responsive to the presence of said overdraft signal for shifting the contents present in said first register prior to the subtraction of the contents of said second register from the contents of said first register, one place toward the most significant digit position and for shifting the contents of said third register one place toward the most significant digit position;

(h) and means connected to said arithmetic means responsive to the presence of said overdraft signal, for preventing carry signals developed during the addition of the contents of said second and third registers from being propagated, the arrangement being such that an additional significant digit of the partial root of said number is developed in said second register.

4. Apparatus as in claim 3 and further including means associated with said third register for examining the contents of a predetermined stage thereof, and for terminating the cycles of computation when said predetermined stage of said third register contains a predetermined value.

5. In a digital computer, means operative on successive cycles for generating the square root of a number, comprising:

(a) a first register for initially storing said number in at least a portion thereof and for subsequently serving as a temporary storage register for partial results developed during said successive cycles;

(b) a second register for initially storing a trail root and for subsequently storing on successive cycles digits of the partially developed roots of said number;

(c) a third register for initially storing in at least a portion thereof a predetermined constant and, on successive cycles, for subsequently storing a multiple of said constant, said first, second and third registers being comprised of a plurality of interconnected bistable stages;

(d) arithmetic means adapted to receive operands from said first and second registers and for producing signals representing the algebraic difference between said operands;

(e) sensing means associated with said arithmetic means for sensing the algebraic sign of said difference representing signals and for producing shifting control signals when said sign is of one value and for producing shifting and inhibiting signals when said sign is of a different value;

(f) transfer means connecting said first and third registers such that the information stored in the individual stages of said first register may be transmitted to corresponding stages of said third register upon receipt of a gating control signal or to lower or higher order stages of said third register upon receipt of shifting control signals from said sensing means;

(g) means including said arithmetic means for producing signals representing the true sum of the contents of said portion of said third register and said second register in the absence of said inhibiting signal, and for producing signals representing the Sum Modulo-2 of the contents of said portion of said third register and said second register when said inhibit signal is produced;

(h) and means connecting said arithmetic means to said second register, the arrangement being such that an additional significant digit of said root is developed in said second register during each of said successive cycles without altering the significant digits developed during preceding cycles.

6. In a digital computer, means operative on successive cycles for generating the square root of a number, comprising:

(a) a first register for initially storing said number and for subsequently serving as a temporary storage register for partial results developed during said successive cycles;

(b) a second register for initially storing a trial root and for subsequently storing on successive cycles signals representing partially developed roots;

(c) a third register for initially storing a predetermined constant and, on successive cycles, for subsequently storing a multiple of said constant;

(d) arithmetic means adapted to receive operands from said first and second registers and for producing signals representing the algebraic difference between the operand in said first register and the operand in said second register;

(e) a fourth register connected to the output of said arithmetic means for at least temporarily holding the difference representing signals during the computation;

(f) sensing means associated with said fourth register for sensing the algebraic sign of said difference representing signals and for producing shifting control signals when said sign is one value and for producing both shifting and inhibiting signals when said sign is a different value;

(g) transfer means connecting said first and fourth registers such that the information stored in the individual stages of said first register may be transmitted to corresponding stages of said fourth register upon receipt of a gating control signal or to lower or higher order stages of said fourth register upon receipt of shifting control signals from said sensing means;

(h) means including said arithmetic means for producing signals representing the true sum of the contents of said third register and said second register in the absence of said inhibiting signal and for producing signals representing the Sum Modulo-2 of the contents of said third register and said second register when said inhibit signal is produced;

(i) and means connecting said arithmetic means to said second register, the arrangement being such that an additional significant digit of said root is developed in said second register during each of said successive cycles without altering the significant digits developed during preceding cycles.

7. In a digital computer, apparatus for generating the square root of a number, during a plurality of cycles of computation, comprising:

(a) first, second and third storage registers each comprised of a plurality of interconnected bistable stages;

(b) means operative during a first cycle for placing said number in said first register, for entering a trial root of said number in said second register and for entering a predetermined constant in said third register;

(c) arithmetic means connected to said first and second registers operative during a second cycle for subtracting the contents of said second register from the contents of said first register, leaving the result in said first register;

(d) sensing means associated with said first register for sensing the sign of the difference resulting from said subtraction;

(e) means operative during a third cycle for shifting the contents of said first register one place toward the most significant digit position and for shifting the contents of said third register one place toward the least significant digit position;

(f) means including said arithmetic means operative during said third cycle for forming the true sum of the contents of said second and third registers, leaving the results in said second register when the output from said sensing means is of a first value;

(g) means connected to said arithmetic means for preventing the propagation of carry signals therein upon the addition of the contents of said second and third register when the output from said sensing means is of a second value, such that the Sum Modulo-2 of the contents of said second and third registers is left in said second register; and (h) control means for repeating said second and third cycles a predetermined number of times, such that an additional significant digit of said square root is developed in said second register each time said third cycle is repeated.

8. Apparatus as in claim 7 wherein the last mentioned means includes means for detecting when one digit of said constant is shifted to a predetermined stage of said third register; and means connecting said detecting means to said control means for terminating stopping the computation when said one digit reaches said predetermined stage.

9. The apparatus as in claim 7 wherein said trial root of said number initially entered in said second register comprises the binary digits 0.01 and wherein said constant initially entered into said third register comprises the binary digits 0.11.

References Cited by the Examiner
UNITED STATES PATENTS

| | | | |
|---|---|---|---|
| 2,888,200 | 5/1959 | Weiss | 235—158 |
| 3,001,709 | 9/1961 | Trussell | 235—158 |
| 3,049,296 | 8/1962 | Hertz et al. | 235—158 |

MALCOLM A. MORRISON, *Primary Examiner.*

M. J. SPIVAK, *Assistant Examiner.*